US012619068B2

(12) United States Patent
Chen et al.

(10) Patent No.: US 12,619,068 B2
(45) Date of Patent: May 5, 2026

(54) OPTICAL ELEMENT DRIVING MECHANISM

(71) Applicant: Actutek Corporation, Taoyuan City (TW)

(72) Inventors: Yi-Ho Chen, Taoyuan City (TW);
Chao-Chang Hu, Taoyuan City (TW);
Mao-Kuo Hsu, Taoyuan City (TW);
Shu-Shan Chen, Taoyuan City (TW);
Chih-Wei Weng, Taoyuan City (TW);
Kai-Jing Fu, Taoyuan City (TW);
Sung-Mao Tsai, Taoyuan City (TW)

(73) Assignee: Actutek Corporation, Taoyuan City (TW)

( * ) Notice: Subject to any disclaimer, the term of this patent is extended or adjusted under 35 U.S.C. 154(b) by 774 days.

(21) Appl. No.: 17/193,579

(22) Filed: Mar. 5, 2021

(65) Prior Publication Data

US 2021/0278627 A1    Sep. 9, 2021

Related U.S. Application Data

(60) Provisional application No. 62/986,039, filed on Mar. 6, 2020.

(51) Int. Cl.
*G02B 26/10* (2006.01)
*G02B 7/182* (2021.01)
(Continued)

(52) U.S. Cl.
CPC ......... *G02B 26/101* (2013.01); *G02B 7/1821* (2013.01); *G02B 26/085* (2013.01);
(Continued)

(58) Field of Classification Search
CPC .. G02B 26/101; G02B 7/1821; G02B 26/085;
G02B 7/023; G02B 7/026; G02B 7/08;
G02B 7/09
(Continued)

(56) References Cited

U.S. PATENT DOCUMENTS 5,912,608 A * 6/1999 Asada .................... H02K 33/18
335/229
5,969,465 A * 10/1999 Neukermans ......... B81B 3/0078
310/40 MM
(Continued)

FOREIGN PATENT DOCUMENTS

CN       216013778 U     3/2022
EP       3674769 A2     7/2020
(Continued)

OTHER PUBLICATIONS

Extended European Search Report dated Nov. 30, 2021 in EP Application No. 21160965.6, 13 pages.
(Continued)

*Primary Examiner* — George G. King
(74) *Attorney, Agent, or Firm* — MUNCY, GEISSLER, OLDS & LOWE, P.C.

(57) ABSTRACT
An optical element driving mechanism is provided in the present disclosure. The optical element driving mechanism includes a fixed portion, a movable portion, a driving assembly and a first connecting assembly. The movable portion is connected to an optical element. The movable portion moves relative to the fixed portion. The driving assembly drives the movable portion to move relative to the fixed portion. The movable portion is movably connected to the fixed portion via the first connecting assembly.

18 Claims, 14 Drawing Sheets

(51) Int. Cl.

| | | |
|---|---|---|
| *G02B 26/08* | (2006.01) |
| *G02B 7/02* | (2021.01) |
| *G02B 7/08* | (2021.01) |
| *G02B 7/09* | (2021.01) |

(52) U.S. Cl.
CPC .............. *G02B 7/023* (2013.01); *G02B 7/026* (2013.01); *G02B 7/08* (2013.01); *G02B 7/09* (2013.01)

(58) Field of Classification Search
USPC .......... 359/201.1–202.1, 872–874, 876, 877
See application file for complete search history.

(56) References Cited

U.S. PATENT DOCUMENTS

| | | | |
|---|---|---|---|
| 7,190,854 | B1 | 3/2007 | Novotny et al. |
| 10,571,552 | B1 | 2/2020 | Gao et al. |
| 2005/0253055 | A1 | 11/2005 | Sprague et al. |
| 2008/0143196 | A1 | 6/2008 | Sprague et al. |
| 2008/0231930 | A1 | 9/2008 | Mizoguchi et al. |
| 2012/0105432 | A1 | 5/2012 | Liao et al. |
| 2016/0306043 | A1 | 10/2016 | Moss et al. |
| 2018/0157029 | A1 | 6/2018 | Lemaire et al. |
| 2020/0355803 | A1* | 11/2020 | Gao ........................ G01S 7/484 |
| 2021/0033848 | A1* | 2/2021 | Suzuki ................ G02B 26/085 |

FOREIGN PATENT DOCUMENTS

| | | | |
|---|---|---|---|
| GB | 2271436 | A | 4/1994 |
| JP | 2017090507 | A | 5/2017 |
| WO | WO2019065746 | A1 | 4/2019 |
| WO | WO-2019/109993 | A1 | 6/2019 |

OTHER PUBLICATIONS

Search Report (dated Apr. 20, 2023) in corresponding CN Application No. 202110247105.7 3 pages.

European Search Report mailed Jul. 23, 2021 in EP Application No. 21160965.6, 14 pages.

Fourth Office Action Application No. 21160965.Jan. 6, 23, 2025, 7 pages.

Office Action with search report issued on Mar. 21, 2026 for the corresponding Chinese Application No. 202311195515.7.

\* cited by examiner

OPTICAL ELEMENT DRIVING MECHANISM

CROSS REFERENCE TO RELATED APPLICATIONS

This application claims the benefit of U.S. Provisional Application No. 62/986,039 filed Mar. 6, 2020, the entirety of which is incorporated by reference herein.

BACKGROUND OF THE INVENTION

Field of the Invention

The present invention relates to an optical element driving mechanism, and, in particular, to an optical element driving mechanism for spatial sensing.

Description of the Related Art

As technology has developed, it has become more common to include spatial sensing functions into many types of modern electronic devices, such as smartphones, gaming devices, household appliances, vehicle electric appliances, etc. Traditionally, the spatial sensing device may include a light source generator for emitting a point light source. A two-dimensional light zone is generated by arranging multiple light source generators in a row and move them at the same time. The light zone reflects on an object, then the reflected rays are received by the spatial sensing device for indicating the distance of the object. Alternatively, the point light source is converted into a linear light beam by a first reflecting device, then the light beam is distributed by a second reflecting device in a direction perpendicular to the direction that the light beam extends. After being converted twice, the point light source may be converted into a light zone. However, while electronic devices these days are increasingly miniaturized, the traditional spatial sensing devices mentioned above are not advantageous for configuration inside such a small electronic device. Thus, the present disclosure provides an optical element driving mechanism that may simultaneously achieve both spatial sensing with a larger range and miniaturization.

BRIEF SUMMARY OF THE INVENTION

An optical element driving mechanism is provided in the present disclosure. The optical element driving mechanism includes a fixed portion, a movable portion, a driving assembly and a first connecting assembly. The movable portion is connected to an optical element. The movable portion moves relative to the fixed portion. The driving assembly drives the movable portion to move relative to the fixed portion. The movable portion is movably connected to the fixed portion via the first connecting assembly.

In accordance with some embodiments of the present disclosure, the movable portion includes a frame, a holder, and a second connecting assembly. The holder is connected to the optical element, moving relative to the frame. The holder is movably connected to the frame via the second connecting assembly. In some embodiments, the movable portion has a first resonant frequency relative to the fixed portion, and the holder has a second resonant frequency relative to the frame. The first resonant frequency and the second resonant frequency are different.

In accordance with some embodiments of the present disclosure, the first connecting assembly has a strip structure extending along a first direction; the second connecting assembly has a strip structure extending along a second direction. The first direction is not parallel to the second direction, and the largest dimension of the first connecting assembly in the first direction is different from the largest dimension of the second connecting assembly in the second direction. In some embodiments, the first direction is perpendicular to the second direction, and the largest dimension of the first connecting assembly in the first direction is greater than the largest dimension of the second connecting assembly in the second direction.

In accordance with some embodiments of the present disclosure, the optical element driving mechanism further includes a control assembly outputting a first driving signal and a second driving signal. The driving assembly includes a first driving element. The first driving element includes a first magnetic unit with a polygonal strip structure and a first coil. The first magnetic unit extends along the first direction. The first coil receives the first driving signal and the second driving signal. The first coil receives the first driving signal, so that the driving assembly drives the movable portion to move relative to the fixed portion in a first dimension. The first coil receives the second driving signal, so that the driving assembly drives the holder to move relative to the frame in a second dimension. The first dimension is different from the second dimension. In some embodiments, a movement in the first dimension is a rotation about a first rotation axis, and a movement in the second dimension is a rotation about a second rotation axis. In some embodiments, the first rotation axis is parallel to the first direction, and the second rotation axis is parallel to the second direction.

In accordance with some embodiments of the present disclosure, the first driving signal includes a travelling signal and a return signal. The travelling signal is received by the first coil, driving the movable portion to perform a first rotation about the first rotation axis relative to the fixed portion. The return signal is received by the first coil, driving the movable portion to perform a second rotation about the first rotation axis relative to the fixed portion. The absolute value of the angular velocity of the first rotation is different from the absolute value of the angular velocity of the second rotation. In some embodiments, the absolute value of the angular velocity of the first rotation is less than the absolute value of the angular velocity of the second rotation.

In accordance with some embodiments of the present disclosure, the frequency of the second driving signal is equal to the second resonant frequency.

In accordance with some embodiments of the present disclosure, the optical element driving mechanism further includes a main axis perpendicular to the first direction and the second direction. When viewed along the main axis, a first connecting line is formed between the first magnetic unit or the first coil and the main axis. The first connecting line is not parallel to the first direction or the second direction.

In accordance with some embodiments of the present disclosure, the first coil receives the first driving signal and the second driving signal at the same time, so that the driving assembly drives the movable portion to move in the first dimension relative to the fixed portion and the holder to move in the second dimension relative to the frame at the same time.

In accordance with some embodiments of the present disclosure, the driving assembly further includes a second driving element. The second driving element includes a second magnetic unit with a polygonal strip structure and a second coil. The second magnetic unit extends along the first direction. The second coil receives the first driving signal and the second driving signal.

In accordance with some embodiments of the present disclosure, the optical element driving mechanism further includes an emission element emitting a light ray to the optical element connected to the holder. The light ray is affected by the movement of the optical element and changes the travelling direction when the holder is driven by the driving assembly to move relative to the frame. In some embodiments, the light ray emitted by the emission element is an impulse wave with at least two different frequencies. In some embodiments, the optical element includes a reflecting mirror.

In accordance with some embodiments of the present disclosure, the optical element driving mechanism further includes a first damping element limiting the movement of the movable portion relative to the fixed portion. The first damping element is in direct contact with the first connecting assembly. In some embodiments, the optical element driving mechanism further includes a second damping element limiting the movement of the holder relative to the frame. The second damping element is in direct contact with the second connecting assembly.

According to some embodiments of the present disclosure, the optical element driving mechanism further includes a circuit component configured to electrically connect the optical element to an external circuit. According to some embodiments of the present disclosure, the first lens includes a first medium and a second medium. A refractive index of the first medium is different from a refractive index of the second medium. The refractive index of the first medium is smaller than the refractive index of the second medium. There is a first interface between the first medium and the second medium. The circuit component drives the first interface to deform. The second medium is closer to the reflective element than the first medium. When viewed along a direction that is parallel to the main axis, the first medium and the second medium at least partially overlap. A voltage is applied to the optical element through the circuit component to chemically change a curvature of the first interface. A piezoelectric mechanism is arranged to connect the optical element, and the curvature of the first interface is changed in a physical manner by the piezoelectric mechanism. The curvature is controlled by at least one of a chemical method or a physical method, thereby controlling an emitting angle of the light emitted through the optical element.

According to some embodiments of the present disclosure, the first lens further includes a third medium, and the third medium is closer to the reflective element than the first medium. There is a second interface between the second medium and the third medium. The first interface and the second interface are not parallel. There is a third interface between the first medium and the second medium. The first interface and the third interface are not parallel. When viewed along a direction that is parallel to the main axis, the first medium and the third medium at least partially overlap. When viewed in a direction perpendicular to the main axis, the second medium and the third medium at least partially overlap.

According to some embodiments of the present disclosure, the driving assembly controls the movable portion to move relative to the fixed portion in the first dimension, thereby controlling a scanning range formed by the light reflected by the optical element. The driving assembly is used to control the movement of the holder relative to the frame in the second dimension, thereby controlling the scanning range. The emitting angle is controlled to further control the scanning range. The refractive index of the first medium is smaller than the refractive index of the second medium, and the refractive index of the second medium is smaller than the refractive index of the third medium, so that the emitting angle is enlarged and the scanning range is enlarged. The scanning range has a rectangular shape, and the movement in the second dimension is controlled to control the size of a long side of the scanning range, and the movement in the first dimension is controlled to control the size of a short side of the scanning range. A cross section area of the light has an elliptical shape, and a long axis of the elliptical shape is perpendicular to the long side of the scanning range.

An optical system is provided in the present disclosure. The optical system includes a plurality of optical element driving mechanisms and a calculating unit. The optical element driving mechanisms are arranged along a third direction. Each of the optical element driving mechanisms outputs a piece of information. The calculating unit integrates multiple pieces of information output by the optical element driving mechanisms into an integrated information. The scope of the integrated information is greater than the scope of any one of the information.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
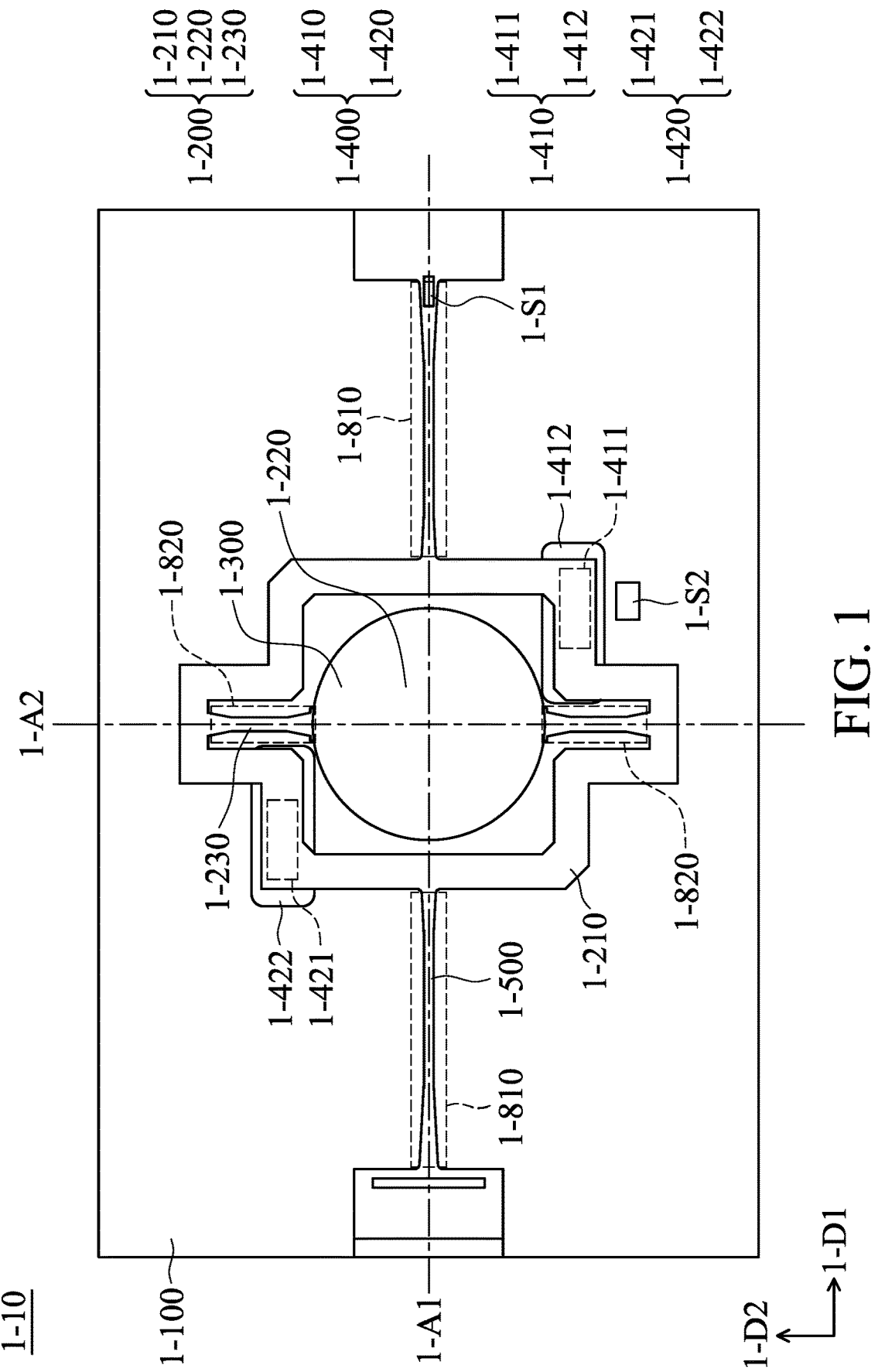
FIG. 1 shows a top view of the optical element driving mechanism in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact.

In addition, the present disclosure may repeat reference numerals and/or letters in the various embodiments. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact. In addition, spatially relative terms, for example, "vertical," "above," "over," "below," "bottom," etc. as well as derivatives thereof (e.g., "downwardly," "upwardly," etc.) are used for ease of the present disclosure of one features relationship to another feature. The spatially relative terms are intended to cover different orientations of the device including the features.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

An optical element driving mechanism is provided in the present disclosure. The optical element is driven by electromagnetic forces to move in two different dimensions, so that the light ray transmitted to the optical element changes its travelling direction, thereby a point light source is converted into a two-dimensional light zone. Specifically, the optical element driving mechanism of the present disclosure converts the point light source into a linear light beam by the movement of the optical element in the first dimension. Next, the optical element driving mechanism multiplies the linear light beam by the movement of the optical element in the second dimension, creating multiple light beams in the direction perpendicular to the direction that the light beam extends, which forms a light zone with a certain area. The light zone may act as a piece of information that may assist the user to determine the distance of an object, for example. The information may be applied in the fields of spatial sensing, etc.

Firstly, referring to FIG. 1, FIG. 1 shows a top view of the optical element driving mechanism 1-10 in accordance with some embodiments of the present disclosure. As shown in FIG. 1, the optical element driving mechanism 1-10 mainly includes a fixed portion 1-100, a movable portion 1-200, a driving assembly 1-400, and a first connecting assembly 1-500.

In some embodiments of the present disclosure, the fixed portion 1-100 may have a polygonal structure. For example, the fixed portion 1-100 has a rectangular structure in FIG. 1. The fixed portion 1-100 has a first side extending along the first direction 1-D1 and a second side extending along the second direction 1-D2. As shown in FIG. 1, the length of the first side is greater than that of the second side. The fixed portion 1-100 may include an accommodating space, in which the movable portion 1-200 may be located. The fixed portion 1-100 may be used to separate the accommodating space from the exterior of the optical element driving mechanism 1-10, so that the substances (e.g. air or liquid, etc.) from the outside is prevented from entering the accommodating space. Thus, the movement of the movable portion 1-200 is not disturbed.

In some embodiments of the present disclosure, the movable portion 1-200 includes a frame 1-210, a holder 1-200, and a second connecting assembly 1-230. In the embodiment shown in FIG. 1, the movable portion 1-200 is connected to the first connecting assembly 1-500 through the frame 1-210. The holder 1-220 is connected to an optical element 1-300, movable relative to the frame 1-210. The holder 1-220 is movably connected to the frame 1-210 via the second connecting assembly 1-230. As shown in FIG. 1, the second connecting assembly 1-230 has a strip structure, extending along the second direction 1-D2. The second connecting assembly 1-230 may be a spring sheet or include any suitable resilient material, so that the holder 1-220 may be movable relative to the frame 1-210.

The optical element 1-300 may be disposed on the holder 1-220 of the movable portion 1-200. In some embodiments, the optical element 1-300 may include a reflecting mirror. In some other embodiments, there may be one or more metal (e.g. aluminum or gold, etc.) coatings on the surface of the optical element 1-300 for reflecting purposes. By disposing an element that reflects lights, the optical element 1-300 may be used to change the travelling direction of the lights when the optical element 1-300 receives them.

In the embodiment shown in FIG. 1, the movable portion 1-200 is movably connected to the fixed portion 1-100 via the first connecting assembly 1-500. In some embodiments, the movable portion 1-200 is connected to the fixed portion 1-100 only by the first connecting assembly 1-500. That is, other than the connection with the first connecting assembly 1-500, the movable portion 1-200 does not connect the fixed portion 1-100 through any other components in the optical element driving mechanism 1-10. As shown in FIG. 1, the first connecting assembly 1-500 has a strip structure, extending along the first direction 1-D1. In some embodiments, the first connecting assembly 1-500 may be a spring sheet or include any suitable resilient material, so that the movable portion 1-200 may be movable relative to the fixed portion 1-100. It should be noted that the first connecting assembly 1-500 and the second connecting assembly 1-230 extends in the first direction 1-D1 and the second direction 1-D2, respectively. In some embodiments, the first direction 1-D1 and the second direction 1-D2 are not parallel to each other, and the largest dimension of the first connecting assembly 1-500 in the first direction 1-D1 is different from the largest dimension of the second connecting assembly 1-230 in the second direction 1-D2. In the embodiment shown in FIG. 1, the first direction 1-D1 is perpendicular to the second direction 1-D2, and the largest dimension of the first connecting assembly 1-500 in the first direction 1-D1 is greater than the largest dimension of the second connecting assembly 1-230 in the second direction 1-D2. In some embodiments, the width of the first connecting assembly 1-500 perpendicular to the first direction 1-D1 is different from the width of the second connecting assembly 1-230 perpendicular to the second direction 1-D2. In some other embodiments, the width of the first connecting assembly 1-500 perpendicular to the first direction 1-D1 is the same with the width of the second connecting assembly 1-230 perpendicular to the second direction 1-D2.

In some embodiments, the movable portion 1-200 (more specifically, the frame 1-210) has a first resonant frequency relative to the fixed portion 1-100, and the holder 1-220 has a second resonant frequency relative to the frame 1-210. In some embodiments, the first resonant frequency is different from the second resonant frequency. That is, the frequencies where the frame 1-210 and the holder 1-220 resonate are different. Therefore, when one of the frame 1-210 or the holder 1-220 resonates, the other one would not resonate at the same time. For example, the second resonant frequency and the other frequency that is way smaller than the second resonant frequency may be input at the same time, making the holder 1-220 resonates while the frame 1-210 vibrates at a smaller frequency, and vice versa.

In some embodiments, the first connecting assembly 1-500 and the second connecting assembly 1-230 may have different coefficients of elasticity (for example, by having different materials or different sizes, etc.), so that the driving force required by the frame 1-210 and the holder 1-220 are different. Therefore, by controlling the components of the signals in the first direction 1-D1 and the second direction 1-D1 that are input to the driving assembly 1-400, the frame 1-210 and the holder 1-220 may be driven to move in different dimensions without influencing or cancelling each other.

In some other embodiments, the first connecting assembly 1-500 may be made of non-resilient materials. In such cases, the movable portion 1-200 is rigidly connected to the fixed portion 1-100 without having a resonant frequency.

In some embodiments of the present disclosure, the movable portion 1-200 moves in a first dimension relative to the fixed portion 1-100, while the holder 1-220 moves in a second dimension relative to the frame 1-210. The first dimension is different from the second dimension. In some embodiments, the movement in the first dimension is a rotation about a first rotation axis 1-A1, and the movement in the second dimension is a rotation about a second rotation axis 1-A2. In the embodiment shown in FIG. 1, the first rotation axis 1-A1 is parallel to the first direction 1-D1, and the second rotation axis 1-A2 is parallel to the second direction 1-D2. In the cases where the first direction 1-D1 is perpendicular to the second direction 1-D2, the movements of the holder 1-220 in the second dimension allows the optical element 1-300 (e.g. a reflecting mirror or a material that reflects light) on the holder 1-200 to convert the received point light source into a linear light beam. Next, the movements of the movable portion 1-200 in the first dimension may multiply the linear light beam in the direction perpendicular to the direction that the light beam extends. In some embodiments, multiple parallel light beams may be generated by the movements of the frame 1-210 and the holder 1-220 of the movable portion 1-200. As a result, the original point light source may be expanded in to a certain area, forming a light zone.

Figure 2:
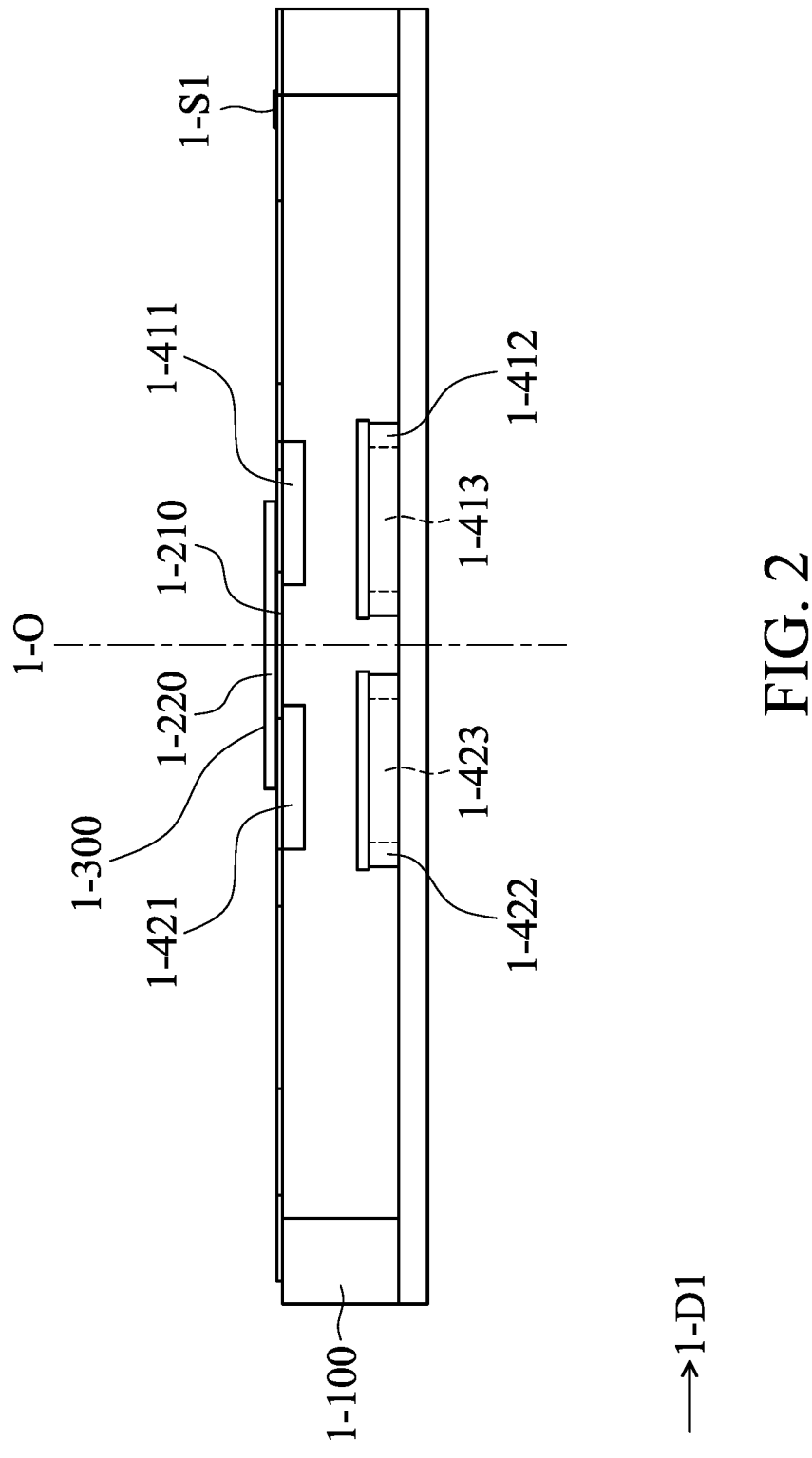
FIG. 2 shows a side view of the optical element driving mechanism in accordance with some embodiments of the present disclosure.

Next, referring to FIG. 1 and FIG. 2, FIG. 2 shows a side view of the optical element driving mechanism 1-10 in accordance with some embodiments of the present disclosure. The driving assembly 1-400 of the optical element driving mechanism 1-10 drives the movable portion 1-200 to move relative to the fixed portion 1-100, and drives the holder 1-220 to move relative to the frame 1-210 as well. In some embodiments, the driving assembly 1-400 includes a first driving element 1-410. In the embodiment shown in FIG. 2, the first driving element 1-410 includes a first magnetic unit 1-411, a first coil 1-412, and a first winding shaft 1-413. The first magnetic unit 1-411 is disposed on the frame 1-210, facing the first coil 1-412. When viewed along the main axis 1-O, the first magnetic unit 1-411 has a polygonal strip structure, extending along the first direction 1-D1. For example, in the embodiments shown in FIG. 1 and FIG. 2, the first magnetic unit 1-411 has a rectangular structure with the longer side extending along the first direction 1-D1. The first coil 1-412 is disposed on the fixed portion 1-100, corresponding to the first magnetic unit 1-411. The first winding shaft 1-413 is disposed at the center of the first coil 1-412. In some embodiments, the first winding shaft 1-413 has a T-shaped structure, with a board structure between the first magnetic unit 1-411 and the first coil 1-412. In some embodiments, the first winding shaft 1-413 may be made of magnetic permeable materials to enhance and concentrate the magnetic force.

In some embodiments, the driving assembly 1-400 may further include a second driving element 1-420. The second driving element 1-420 may include a second magnetic unit 1-421, a second coil 1-422, and a second winding shaft 1-423. As shown in FIG. 1, the second driving element 1-420 may be disposed diagonally to the first driving element 1-410 on the frame 1-210. The configuration of the second magnetic unit 1-421, the second coil 1-422, and the second winding shaft 1-423 of the second driving element 1-420 is similar to configuration of the first driving element 1-410 that is mentioned above. For the purpose of simplicity and clarity, it is not repeated here.

In some embodiments, when viewed along the main axis 1-O that is perpendicular to the first direction 1-D1 and the second direction 1-D2, as shown in FIG. 1, a first connecting line is formed between the first magnetic unit 1-411 or the first coil 1-412 and the main axis 1-O. The first connecting line is not parallel to the first direction 1-D1 or the second direction 1-D2. In the embodiment shown in FIG. 1, there are substantially 45 degree angles formed between the first connecting line and the first direction 1-D1 and the second direction 1-D2. In some embodiments where the second driving element 1-420 is included, the first connecting line may pass through the second magnetic unit 1-421 or the second coil 1-422 when viewed along the main axis 1-0. According to some embodiments of the present disclosure, the first connecting line that is not parallel to the first direction 1-D1 or the second direction 1-D2 allows the driving force generated by the first driving element 1-410 and/or the second driving element 1-420 to have components in the first direction 1-D1 and the second direction 1-D2, in order to drive the frame 1-210 and the holder 1-220 of the movable portion 1-200 to move, respectively.

Figure 3:
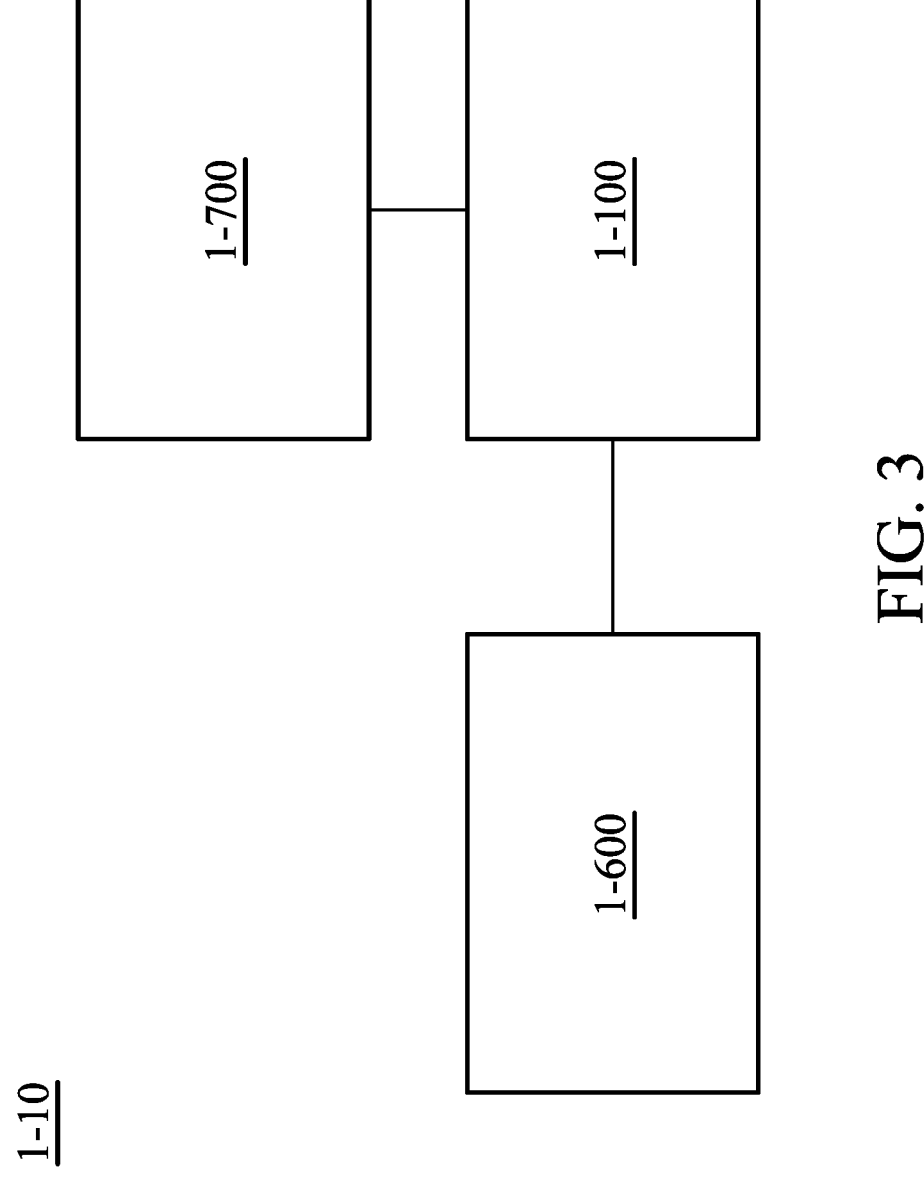
FIG. 3 shows a schematic view of the fixed portion of the optical element driving mechanism in connection with a control assembly and an emission element in accordance with some embodiments of the present disclosure.

Next, referring to FIG. 3, FIG. 3 shows a schematic view of the fixed portion 1-100 of the optical element driving mechanism 1-10 in connection with a control assembly 1-600 and an emission element 1-700 in accordance with some embodiments of the present disclosure. In some embodiments, the optical element driving mechanism 1-10 may further include a control assembly 1-600. The control assembly 1-600 may be disposed outside the fixed portion 1-100 or anywhere suitable in the optical element driving mechanism 1-10. The control assembly 1-600 may output a first driving signal and a second driving signal to the first coil 1-412 and/or the second coil 1-422. The first coil 1-412 and/or the second coil 1-422 receives the first driving signal, so that the driving assembly 1-400 drives the movable portion 1-200 to move in the first dimension relative to the fixed portion 1-100. The first coil 1-412 and/or the second coil 1-422 receives the second driving signal, so that the driving assembly 1-400 drives the holder 1-220 to move in the second dimension relative to the frame 1-210.

It should be noted that the first coil 1-412 and/or the second coil 1-422 may receive the first driving signal and the second driving signal at the same time, so that the driving assembly 1-400 may drive the frame 1-210 of the movable portion 1-200 to move in the first dimension relative to the fixed portion 1-100 and the holder 1-220 to move in the second dimension relative to the frame 1-210 at the same time.

In some embodiments, the frequency of the second driving signal may be equal to the second resonant frequency of the holder 1-220. Compared with the normal vibrating frequency, the moving range of the holder 1-220 significantly increases when the holder 1-220 resonates at the second resonant frequency. This elongates the length of the light beam generated by the optical element 1-300, improving the efficiency of the optical element driving mechanism 1-10.

In the embodiments shown in FIG. 1 and FIG. 2, after the first coil 1-412 and/or the second coil 1-422 receives the first driving signal and/or the second driving signal, an induced magnetic field is generated. The magnetic field interacts with the first magnetic unit 1-411 and/or the second magnetic unit 1-421, generating a driving force which drives the holder 1-210 of the movable portion 1-200 and the holder 1-220 to move. In some other embodiments, instead of the first magnetic unit 1-411 and the second magnetic unit 1-421, the frame 1-210 may be made of magnetic permeable materials (e.g. iron or nickel, etc.). After the first coil 1-412 and/or the second coil 1-422 receives the driving signal, the induced magnetic field interacts with the frame 1-210 directly, generating the driving force.

In some embodiments, the first driving signal may include a travelling signal and a return signal. Both the travelling signal and the return signal may be received by the first coil 1-412 and/or the second coil 1-422, driving the movable portion 1-200 to rotate about the first rotation axis 1-A1 relative to the fixed portion 1-100. Specifically, the travelling signal drives the movable portion 1-200 to perform a first rotation about the first rotation axis 1-A1 relative to the fixed portion 1-100. The return signal drives the movable portion 1-200 to perform a second rotation about the first rotation axis 1-A1 relative to the fixed portion 1-100. In some embodiments, the directions of the first rotation and the second rotation are opposite, and the absolute value of the angular velocity of the first rotation is different from the absolute value of the angular velocity of the second rotation. For example, in some embodiments, the absolute value of the angular velocity of the first rotation is less than the absolute value of the angular velocity of the second rotation. In such embodiments, the first rotation allows the optical element 1-300 to multiply the number of the reflected light beams in the direction perpendicular to the direction that the light beam extends, for example, by generating multiple parallel and equally-spaced light beams in the direction perpendicular to the direction that the light beam extends with a constant rotation speed. The second rotation allows the movable portion 1-200 to return to its initial position with a speed faster than the first rotation, so that the movable portion 1-200 may perform the first rotation in a short period of time without interference during the return.

In the embodiment shown in FIG. 1, the optical element driving mechanism 1-10 further includes a first sensing element 1-S1 and a second sensing element 1-S2. The first sensing element 1-S1 may be a strain gauge or any other suitable sensing element. The first sensing element 1-S1 is used to measure the strain or rotation angle of the first connecting assembly 1-500, in order to control the movement of the movable portion 1-200 in the first dimension more precisely. The second sensing element 1-S2 may be a magnetic field sensing element or any other suitable sensing element. The second sensing element 1-S2 is used to measure the variation of the magnetic field of the driving assembly 1-400, in order to control the movement of the second connecting assembly 1-230 in the second dimension more precisely.

As shown in FIG. 3, the optical element driving mechanism 1-10 may further include an emission element 1-700. The emission element 1-700 may be disposed outside the fixed portion 1-100 or anywhere suitable in the optical element driving mechanism 1-10. The emission element 1-700 may be a light source generator for emitting a light ray to the optical element 1-300 connected to the holder 1-220. The light ray is affected by the movement of the optical element 1-300 and changes its travelling direction when the holder 1-220 is driven by the driving assembly 1-400 to move relative to the frame 1-210. It should be noted that the travelling direction of the light ray may be directly or indirectly changed by the optical element 1-300. In some embodiments of the present disclosure, the optical element 1-300 is an element that reflects lights. Therefore, the travelling direction of the light ray changes once it reaches the optical element 1-300. In this case, the incident point light source is reflected, however, the emitted light is still a point light. If the holder 1-220 moves, such as in the present disclosure, the incident point light source follows the rotation of the holder 1-220 about the second rotation axis 1-A2, projects on a straight line, forming a linear light beam. As mentioned above, if the movement of the frame 1-210 is added, multiple parallel and equally-spaced light beams may be formed in the direction perpendicular to the direction that the light beam extends, creating a light zone with a certain area.

It should be understood that the light ray emitted by the emission element 1-700 may be a visible light, an invisible light, or an electromagnetic wave at any frequency band, depending on actual applications. In some embodiments, the light ray emitted by the emission element 1-700 is an impulse wave, and the second driving signal output by the control assembly 1-600 may be a sine wave. The reflected light by the holder 1-220 that is driven by a sine wave may be distributed unevenly. The emission element 1-700 of the present disclosure may emit the light ray with at least two different frequencies during one cycle (back and forth) of the movement of the holder 1-220 driven by the driving assembly 1-400 relative to the frame 1-210 in the second dimension. Changing the frequencies at which the impulse wave is emitted may compensate the uneven distribution of the light caused by the sine wave.

In some embodiments, the optical element driving mechanism 1-10 may further include a receiving element (not shown). After the light ray emitted by the emission element 1-700 creates a light zone by changing its travelling direction through the optical element 1-300, the light zone reaches an object, and the receiving element receives the reflection of the light zone, generating information 1-I. In this case, the information 1-I may cover a certain area which substantially equals the area of the light zone.

Figure 4:
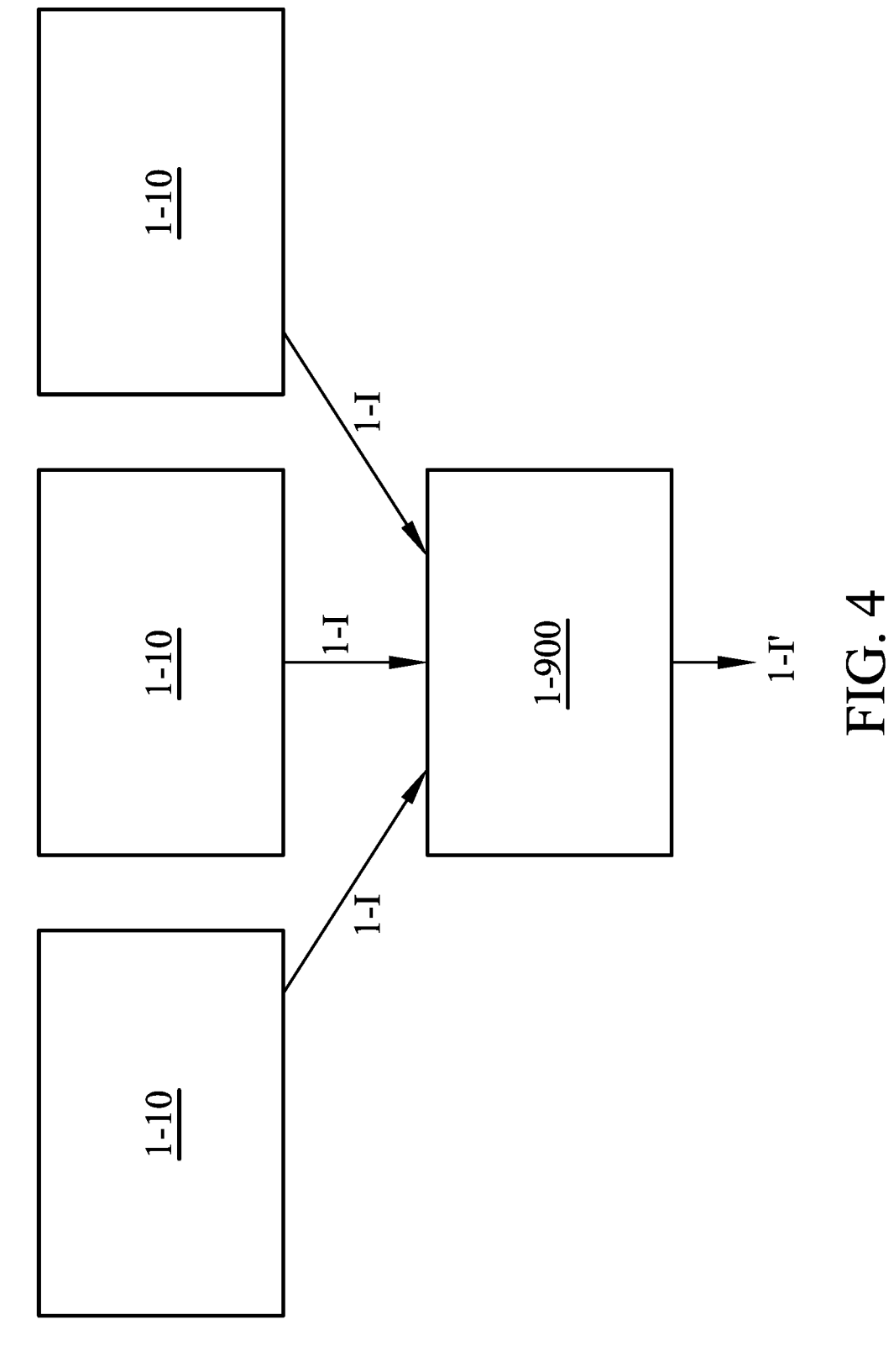
FIG. 4 shows a schematic view of the optical system in accordance with some embodiments of the present disclosure.

FIG. 4 shows a schematic view of the optical system 1-20 in accordance with some embodiments of the present disclosure. The optical system 1-20 includes a plurality of optical element driving mechanisms 1-10 and a calculating unit 1-900. In the embodiment shown in FIG. 4, the optical system 1-20 includes three optical element driving mechanisms 1-10. However, the number of the optical element driving mechanisms 1-10 is not intended to be limiting. Multiple optical element driving mechanisms 1-10 are arranged along a third direction. The third direction may be the same as or different from the first direction 1-D1 or the second direction 1-D2. In some embodiments, the optical element driving mechanisms 1-10 may not be arranged in a straight line. Rather, optical element driving mechanisms 1-10 may be disposed at any suitable locations based on actual needs. Each of the optical element driving mechanisms 1-10 in the optical system 1-20 outputs a piece of information 1-I. The calculating unit 1-900 integrates multiple pieces of information 1-I into an integrated information 1-I'. In some embodiments of the present disclosure, the information 1-I covers a certain area. The size of the area covered by the integrated information 1-I' is proportional to the number of information 1-I integrated by the calculating unit 1-900. For example, when the integrated information 1-I' includes N pieces of information 1-I, the area covered by the integrated information 1-I' is N times larger than the area covered by the information 1-I. Therefore, the scope of the integrated information 1-I' is greater than the scope of any one of the information 1-I, providing users with a broader spatial sensing function.

Returning to FIG. 1, in some embodiments, the optical element driving mechanism 1-10 further includes first damping elements 1-810 and second damping elements 1-820. The first damping elements 1-810 and the second damping elements 1-820 may be made of resin or any suitable cushioning material. As shown in FIG. 1, the first damping elements 1-810 is disposed on the first connecting assembly 1-500, and in direct contact with the first connecting assembly 1-500, limiting the movement of the movable portion 1-200 relative to the fixed portion 1-100. More specifically, the first damping element 1-810 may be used to restrict any abnormal vibration of the movable portion 1-200 relative to the fixed portion 1-100, enhancing the structural strength of the first connecting assembly 1-500, improving the stability of the movement of the movable portion 1-200 in the first dimension. In the embodiment shown in FIG. 1, the first damping element 1-810 may be wrapped around the entire first connecting assembly 1-500. As a result, the first damping element 1-810 may be in direct contact with the fixed portion 1-100 and the movable portion 1-200.

Similarly, the second damping elements 1-820 is disposed on the second connecting assembly 1-230, and in direct contact with the second connecting assembly 1-230, limiting the movement of the holder 1-220 relative to the frame 1-210. More specifically, the second damping element 1-820 may be used to restrict any abnormal vibration of the holder 1-220 relative to the frame 1-210, enhancing the structural strength of the second connecting assembly 1-230, improving the stability of the movement of the holder 1-220 in the second dimension. In the embodiment shown in FIG. 1, the second damping element 1-820 may be wrapped around the entire second connecting assembly 1-230. As a result, the second damping element 1-820 may be in direct contact with the frame 1-210 and the holder 1-220.

In summary, the optical element driving mechanism 1-10 provided in the present disclosure may effectively convert a point light source into a light zone for spatial sensing purposes. By disposing the first connecting assembly 1-500 and the second connecting assembly 1-230, biaxial rotation may occur at the same time, reducing the overall volume of the optical element driving mechanism 1-10. The area of the light zone may be further increased by resonating the second connecting assembly 1-230. The present disclosure also provides an optical system 1-20 including multiple optical element driving mechanisms 1-10 that is advantageous for an even broader spatial sensing.

Figure 5:
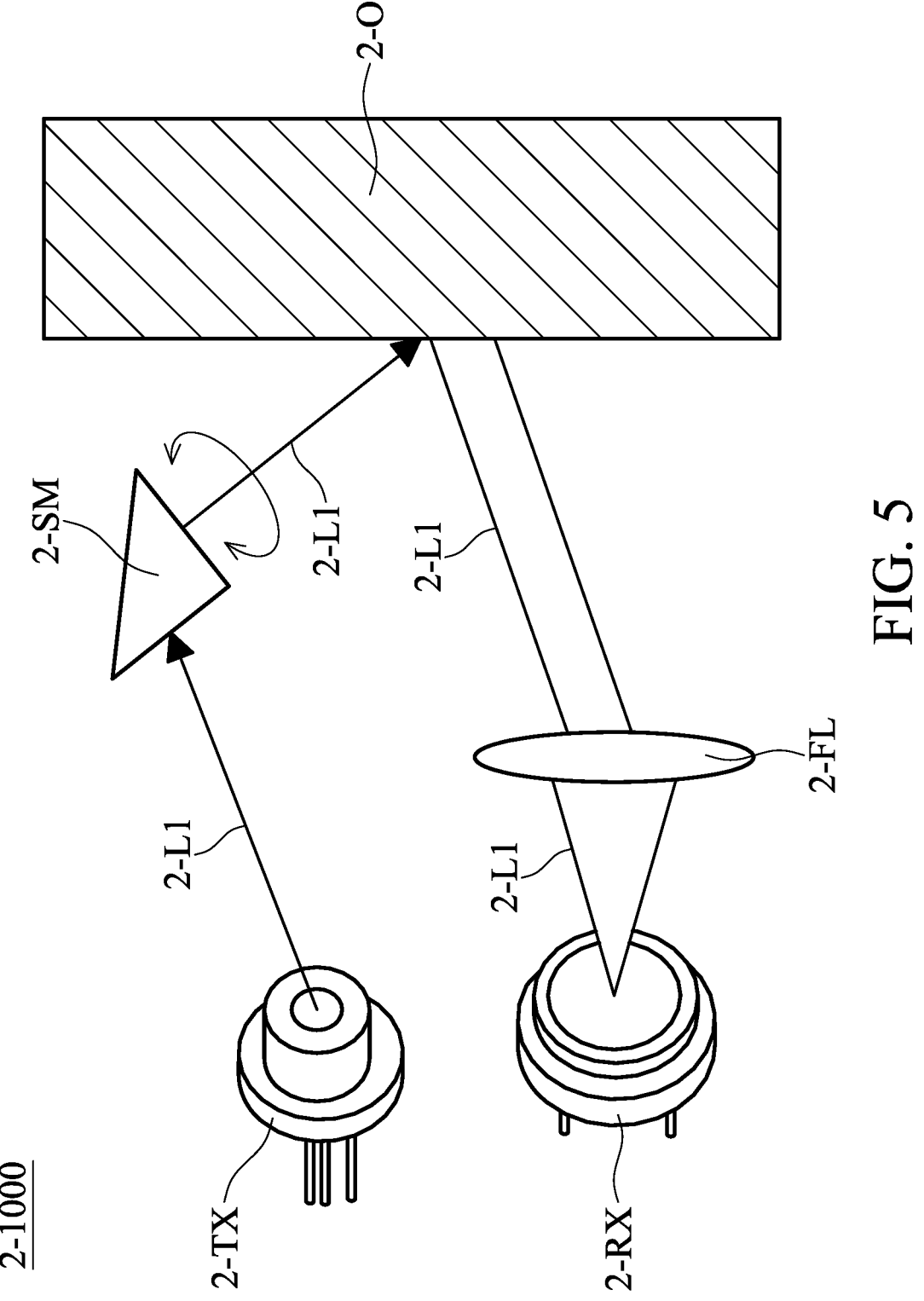
FIG. 5 is a schematic diagram of an optical sensing system according to an embodiment of the disclosure.
Figure 6:
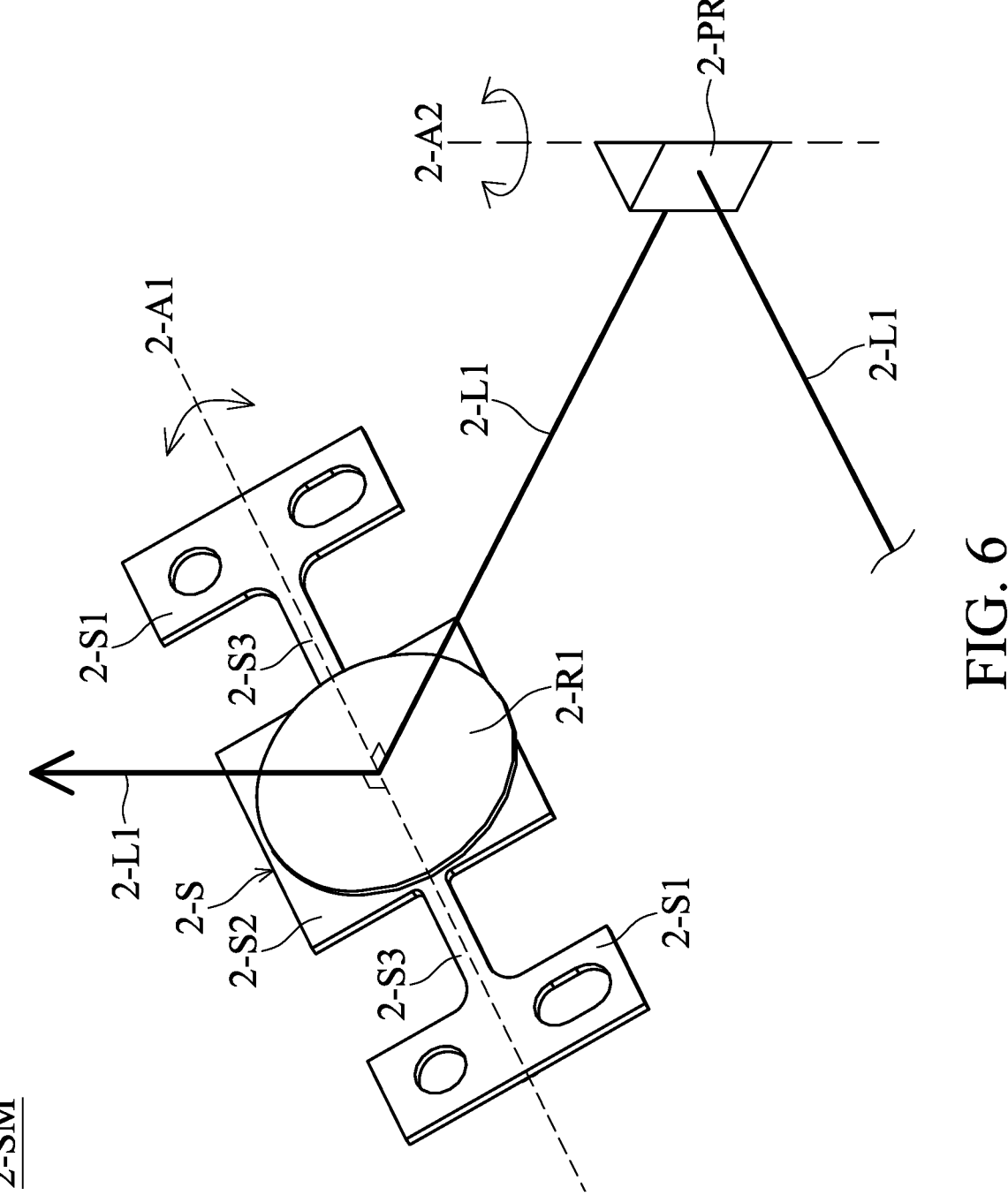
FIG. 6 is a schematic diagram of an optical module in FIG. 5 changing a light traveling direction.

Refer to FIG. 5 and FIG. 6. FIG. 5 is a schematic diagram of an optical sensing system 2-1000 of an embodiment of the disclosure. FIG. 6 is a schematic diagram of an optical module 2-SM in FIG. 5 changing the traveling direction of a light ray 2-L1. The optical sensing system 2-1000 of this embodiment mainly includes an emitting element 2-TX, a receiving element 2-RX, the optical module 2-SM, and a focusing lens 2-FL (focusing lens). As shown in FIG. 6, the optical module 2-SM includes a first optical element 2-PR and a second optical element 2-R1. The first optical element 2-PR and the second optical element 2-R1 may be driven separately to rotate around a first axis 2-A1 and a second axis 2-A2 within a specific angle range.

When a light 2-L1 emitted by the emitting element 2-TX reaches the first optical element 2-PR in the optical module 2-SM along an initial direction, then the light 2-L1 will be guided by the first optical element 2-PR and transmitted to the second optical element 2-R1 along an incident direction. Then, the light 2-L1 will be reflected by the second optical element 2-R1 and emitted along an emitting direction to reach a surface of the object 2-O, wherein the first axis 2-A1 is perpendicular to the incident direction and the emitting direction, and the second axis 2-A2 is perpendicular to the initial direction and the incident direction. Then, the light 2-L1 reflected by the object 2-O will pass through the focusing lens 2-FL and reach the receiving element 2-RX. The receiving element 2-RX may convert the received optical signal into an electrical signal and transmit it to a processor (not shown), thereby the 3D surface and depth information of the object 2-O may be known.

In some embodiments, the first optical element 2-PR may be a prism, and the second optical element 2-R1 may be a reflector. The second optical element 2-R1 is disposed on an elastic element 2-S. In some embodiments, the elastic element 2-S may be a spring sheet with two fixed portions 2-S1, a movable portion 2-S2, and two connecting portions 2-S3. The movable portion 2-S2 is a plate-shaped holder 2-S2 that may hold the second optical element 2-R1. The connecting portion 2-S3 is connected to the fixed portion 2-S1 and the movable portion 2-200, so that the movable portion 2-S2 may move relative to the fixed portion 2-S1.

In some embodiments, the second optical element 2-R1 may be rotated around the first axis 2-A1 in a first angle range by means of open-loop control. In addition, the first optical element 2-PR may be rotated around the second axis 2-A2 in a second angle range through closed-loop control.

In some embodiments, the holder 2-S2 has a resonance frequency. By applying an alternating current signal and making the frequency of the alternating current signal correspond to the resonance frequency, the holder 2-S2 may be driven to rotate back and forth around the first axis 2-A1, and the first optical element 2-PR may be driven by a Voice Coil Motor (VCM) to rotate around the second axis 2-A2.

Figure 7:
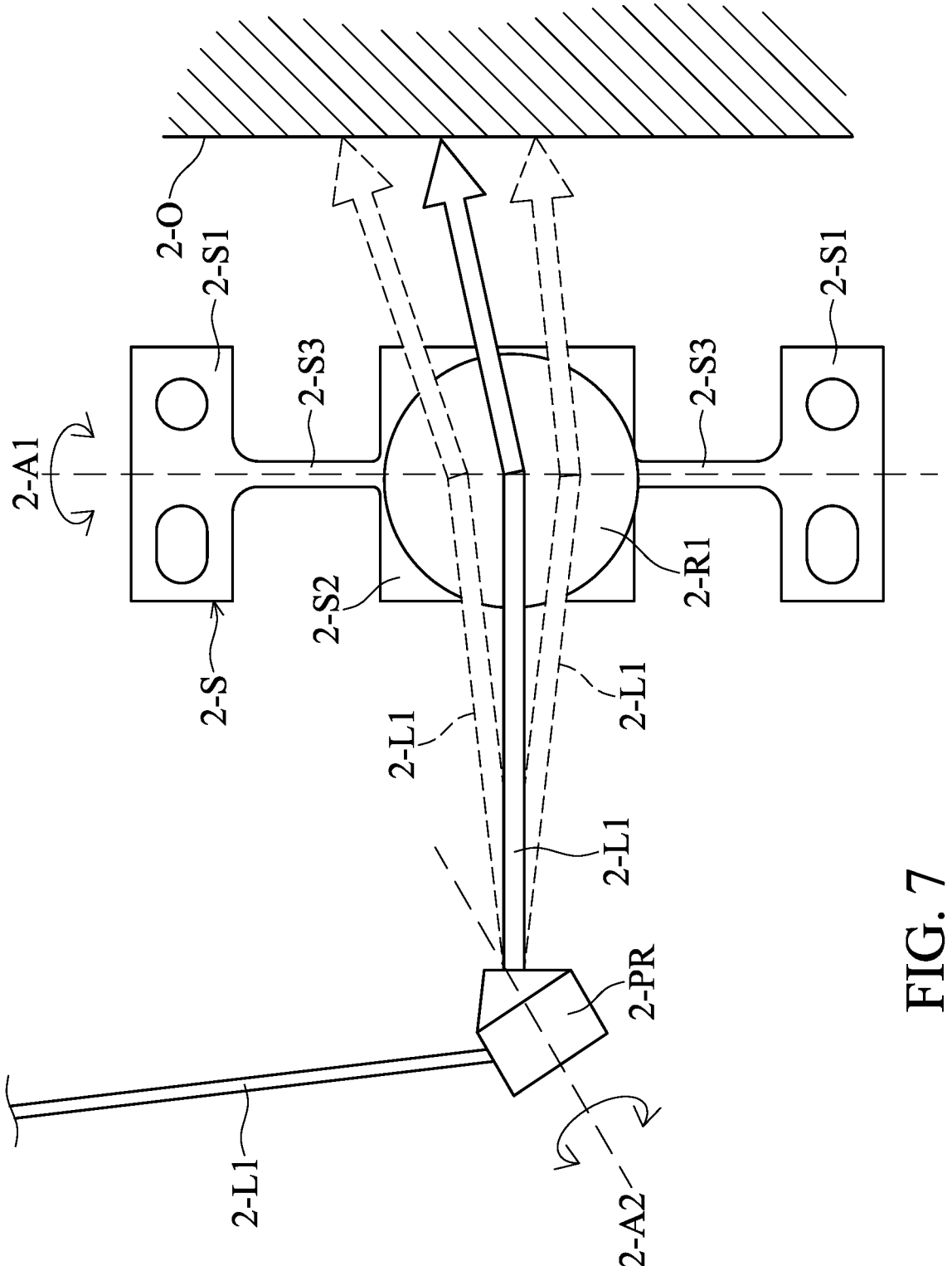
FIG. 7 is a schematic diagram of the light reflected by a second optical element to a surface of an object when a first optical element rotates around a second axis.
Figure 8:
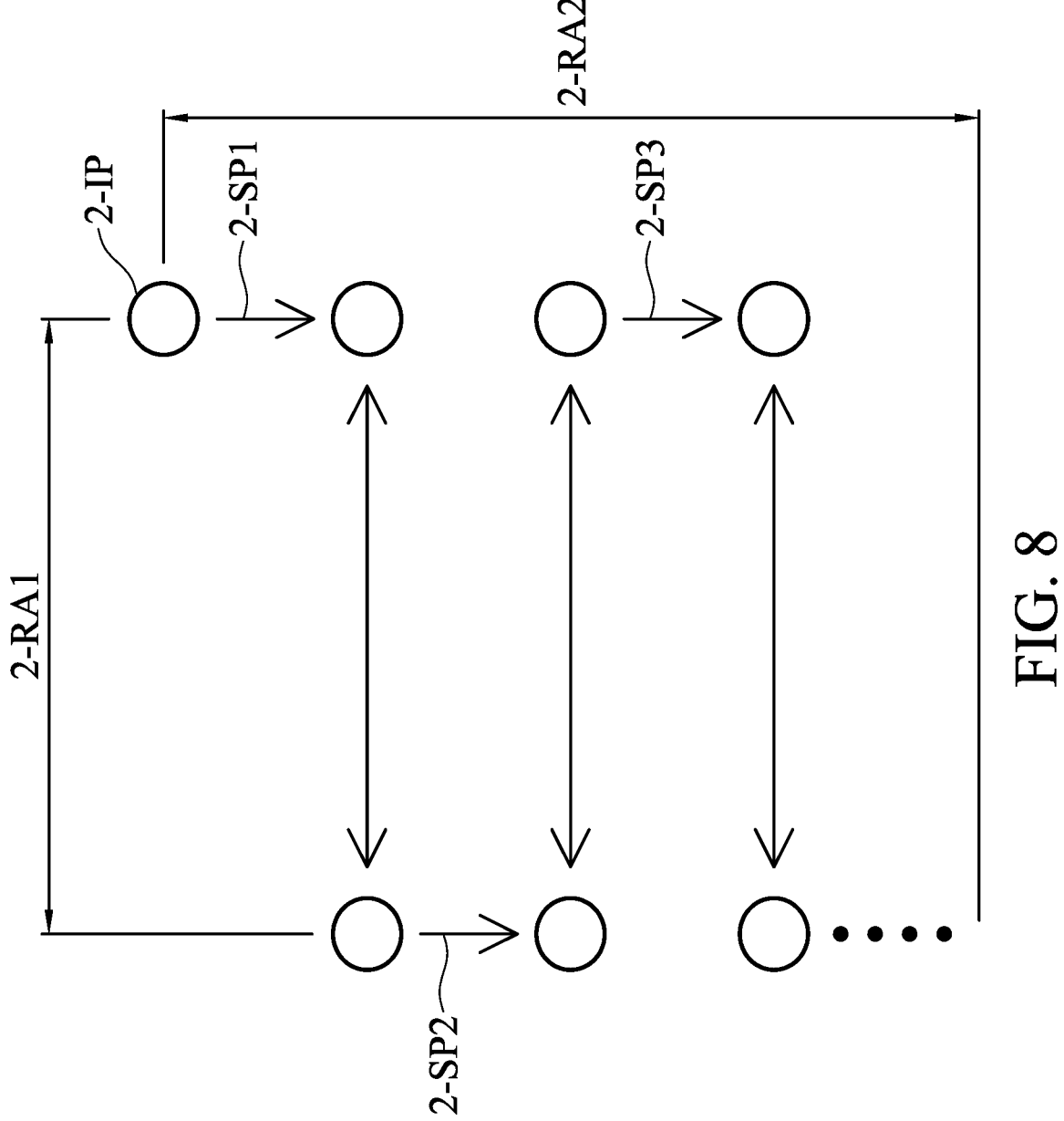
FIG. 8 is a schematic diagram of the second optical element continuously rotating around a first axis within a first angle range, and the first optical element rotating around the second axis in an intermittently stepped manner within a second angle range.

Refer to FIG. 7 and FIG. 8. FIG. 7 is a schematic diagram of the light 2-L1 reflected by the second optical element 2-R1 to the surface of the object 2-0 when the first optical element 2-PR rotates around the second axis 2-A2. FIG. 8 is a schematic diagram of the second optical element 2-R1 continuously rotating around the first axis 2-A1 within a first angle range 2-RA1, and the first optical element 2-PR rotating around the second axis 2-A2 in an intermittently stepped manner within a second angle range 2-RA2.

As shown in FIG. 7, when the first optical element 2-PR rotates around the second axis 2-A2, the light 2-L1 may be moved through a fan-shaped area. Because the second optical element 2-R1 also rotates back and forth around the first axis 2-A1, the light 2-L1 may be used to perform depth sensing or 3D scanning within a specific area on the surface of the object 2-0.

It can be seen from FIG. 8 that the holder 2-S2 of the elastic element 2-S and the second optical element 2-R1 in this embodiment are mainly rotated around the first axis 2-A1 back and forth in a first angle range 2-RA1 in a continuous motion relative to the fixed portion, and the first optical element 2-PR is rotated around the second axis 2-A2 in the intermittently stepped manner relative to the fixed portion in the second angle range 2-RA2.

It should be particularly noted that when the light 2-L1 is rotated from an initial position 2-IP along a predetermined direction around the second axis 2-A2 by a step angle 2-SP1, the first optical element 2-PR will temporarily stop rotating around the second axis 2-A2, and then wait for the holder 2-S2 of the elastic element 2-S and the second optical element 2-R1 to completely move through the first angle range 2-RA1, the first optical element 2-PR will then continue to rotate around the second axis 2-A2 by another step angle 2-SP2 along the predetermined direction.

In the same way, when the first optical element 2-PR rotates around the second axis 2-A2 by the step angle 2-SP2, the first optical element 2-PR will also temporarily stop rotating around the second axis 2-A2, then wait for the holder 2-S2 of the elastic element 2-S and the second optical element 2-R1 to completely move through the first angle range 2-RA1, the first optical element 2-PR will then continue to rotate around the second axis 2-A2 by another step angle 2-SP3 in the predetermined direction. It should be understood from the foregoing description that as the second optical element 2-R1 and the first optical element 2-PR rotate around the first axis 2-A1 and the second axis 2-A2, respectively, the depth sensing or 3D scanning may be performed by the light 2-L1 on a specific area of the surface of the object 2-0.

Figure 9:
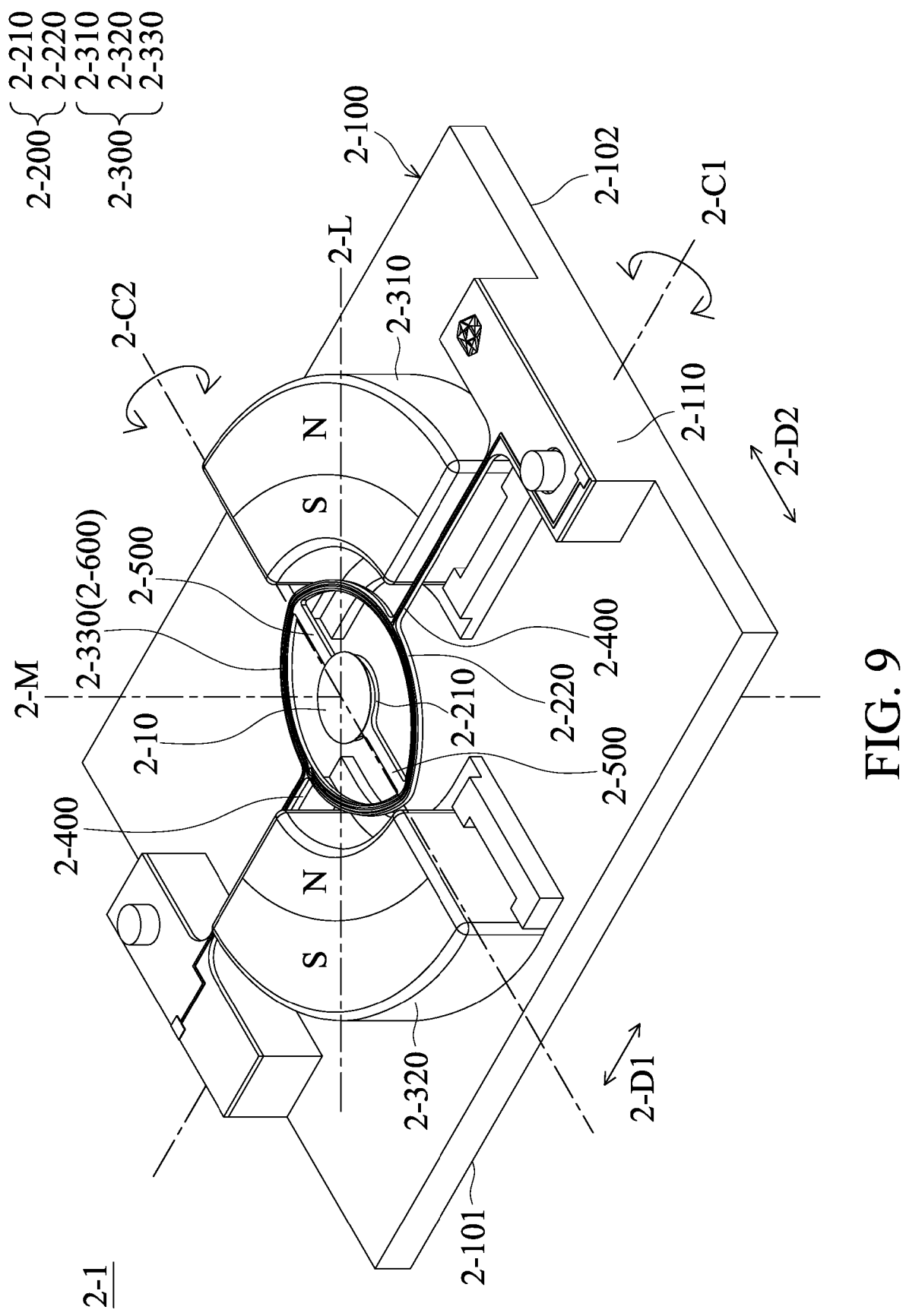
FIG. 9 is a perspective view of a partial structure of an optical element driving mechanism of another embodiment of the disclosure.
Figure 10:
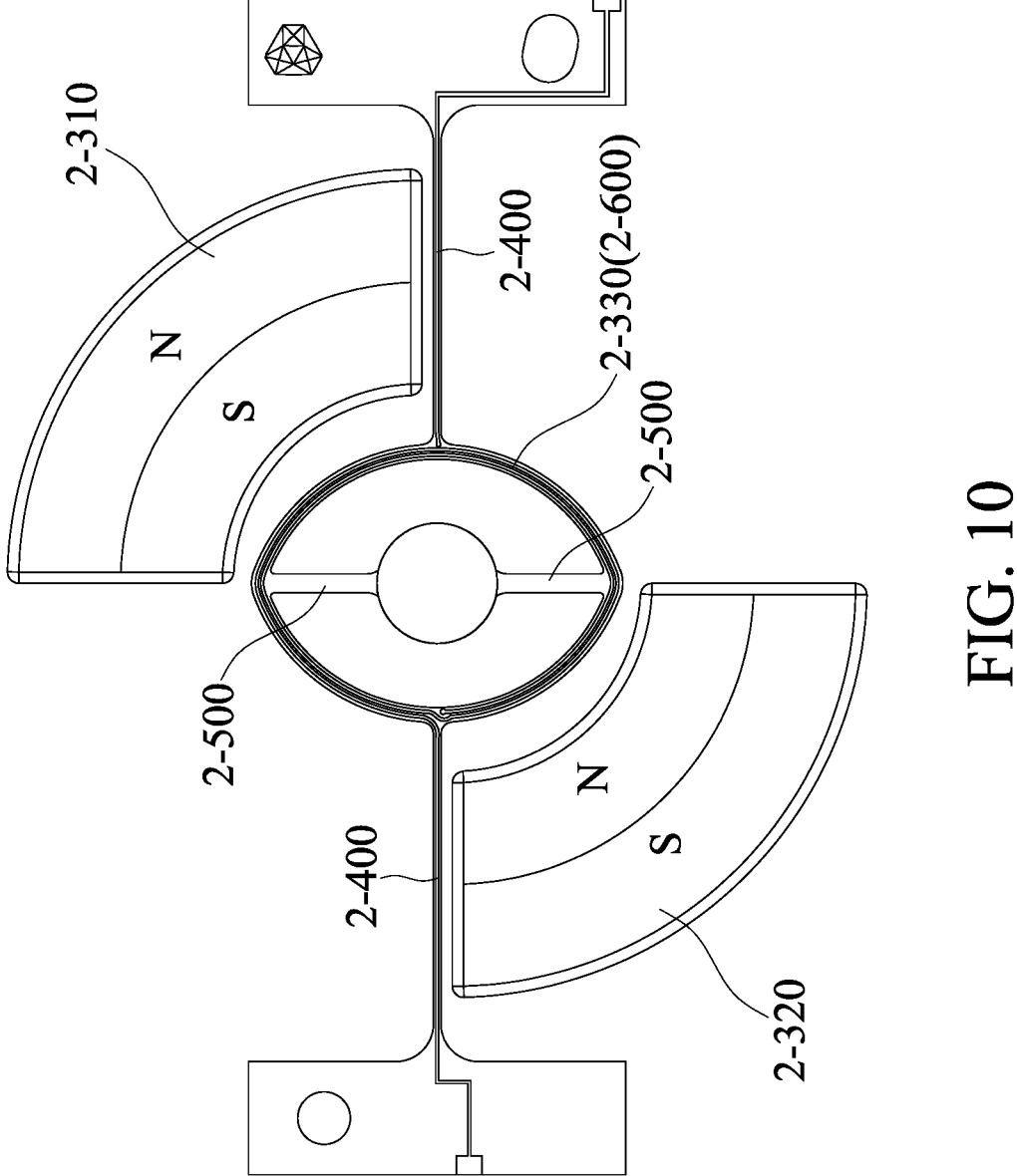
FIG. 10 is a top view of a partial structure of the optical element driving mechanism of another embodiment of the disclosure.
Figure 11:
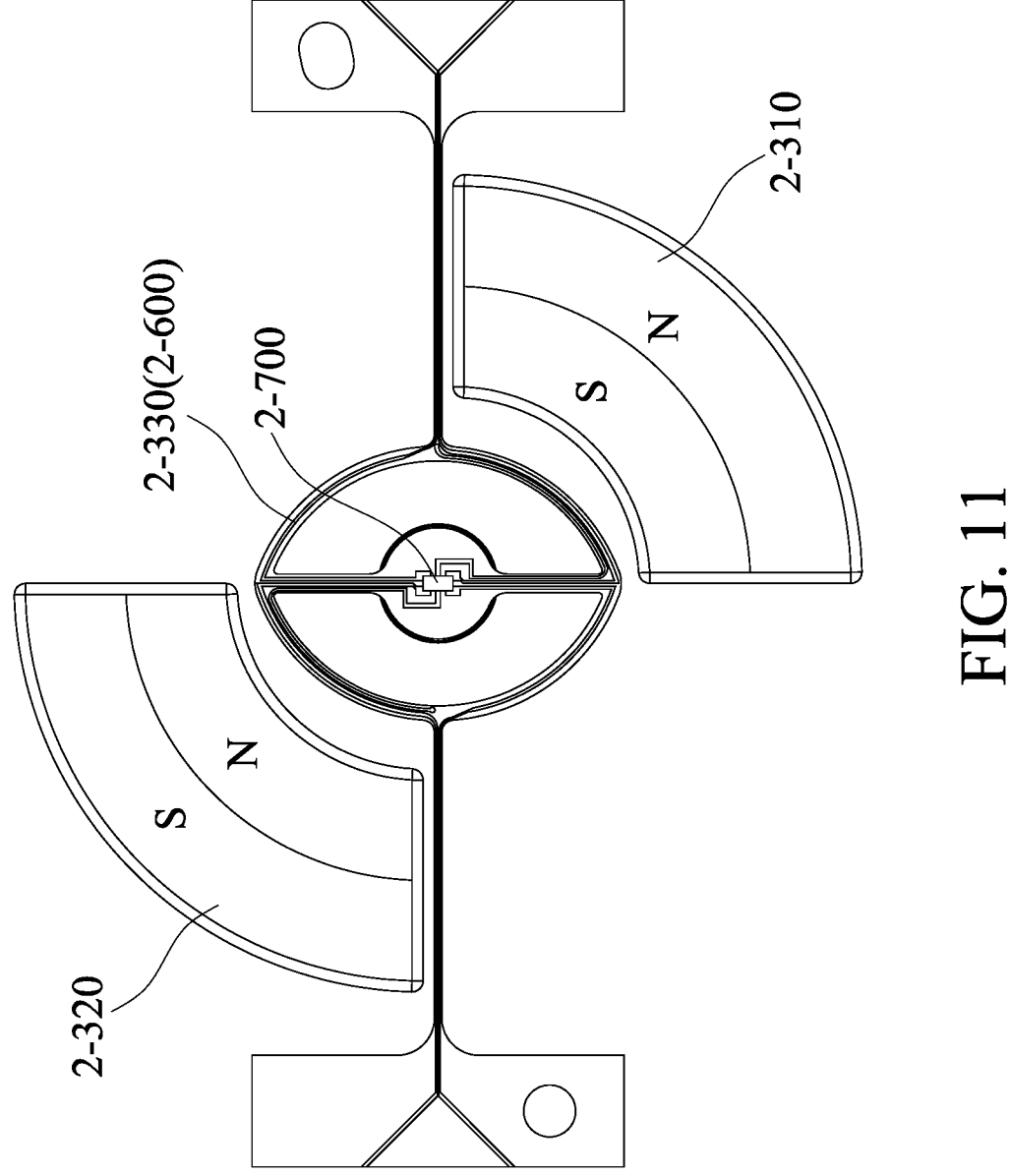
FIG. 11 is a bottom view of a partial structure of the optical element driving mechanism of another embodiment of the disclosure.

However, the optical sensing system 2-1000 is not limited to the configuration described above. For example, refer to FIGS. 9 to 11, FIG. 9 is a partial structure of an optical element driving mechanism 2-1 of another embodiment of the disclosure. FIG. 10 is a top view of a partial structure of the optical element driving mechanism 2-1 of another embodiment of the disclosure. FIG. 11 is a bottom view of a partial structure of the optical element driving mechanism 2-1 of another embodiment of the disclosure. In the following description, elements with similar functions as those in the embodiments describe above may use the same reference numerals.

Compared with the embodiment of FIG. 5 and FIG. 6 using two optical elements (the first optical element 2-PR and the second optical element 2-R1), in this embodiment, only one optical element is used to the make the light 2-L1 perform depth sensing or 3D scanning within a specific area on the surface of the object 2-O. As shown in FIG. 9, the optical element driving mechanism 2-1 has a main axis 2-M, including an optical element 2-10, a fixed portion 2-100, a movable portion 2-200, a driving assembly 2-300, a first connecting assembly 2-400, a second connecting assembly 2-500, and a circuit component 2-600.

In this embodiment, the fixed portion 2-100 has a polygonal structure. When viewed along a direction that is parallel to the main axis 2-M, the fixed portion 2-100 is rectangular and has a first side 2-101 and a second side 2-102. The first side 2-101 extends along a first direction 2-D1, and the second side 2-102 extends along a second direction 2-D2. The first direction 2-D1 and the second direction 2-D2 are not parallel. More specifically, the first direction 2-D1 and the second direction 2-D2 are perpendicular to each other, and the first direction 2-D1, the second direction 2-D2, and the main axis 2-M are perpendicular to each other. A length of the first side 2-101 is greater than a length of the second side 2-102. The fixed portion 2-100 includes a base 2-110 and a housing (not shown). The base 2-110 and the housing form an accommodating space to accommodate the movable portion 2-200 and prevent external gas or liquid entering this accommodation space. In other words, it can prevent the movement of the movable portion 2-200 relative to the fixed portion 2-100 from being affected by the interference of external air or liquid, thereby affecting the quality of scanning.

The movable portion 2-200 is movably connected to the fixed portion 2-100 via the first connecting assembly 2-400. More specifically, the movable portion 2-200 is only connected to the fixed portion 2-100 via the first connecting assembly 2-400. The movable portion 2-200 includes a holder 2-210 and a frame 2-220, and the holder 2-210 is movably connected to the frame 2-220 via the second connecting assembly 2-500. The holder 2-210 is made of metal material, and may hold the optical element 2-10. The optical element 2-10 is configured to change the traveling direction of the light 2-L1.

Both the first connecting assembly 2-400 and the second connecting assembly 2-500 have a long strip structure, the first connecting assembly 2-400 extends along the first direction 2-D1, and the second connecting assembly 2-500 extends along the second direction 2-D2. A maximum dimension of the first connecting assembly 2-400 in the first direction 2-D1 is different from a maximum dimension of the second connecting assembly 2-500 in the second direction. More specifically, the maximum dimension of the first connecting assembly 2-400 in the first direction 2-D1 is greater than the maximum dimension of the second connecting assembly 2-500 in the second direction 2-D2. In addition, the maximum dimension of the first connecting assembly 2-400 in the second direction 2-D2 is different from the maximum dimension of the second connecting assembly 2-500 in the first direction 2-D1. More specifically, the maximum dimension of the first connecting assembly 2-400 in the second direction 2-D2 is smaller than the maximum dimension of the second connecting assembly 2-500 in the first direction 2-D1.

A damping element may be provided to suppress abnormal movement between the two elements. In some embodiments, a first damping element (not shown) is provided to suppress abnormal movement of the movable portion 2-200 relative to the fixed portion 2-100. A second damping element (not shown) is provided to suppress abnormal movement of the holder 2-210 relative to the frame 2-220. The first damping element and the second damping element may be made of a resin material. The first damping element may directly contact the first connecting assembly 2-400, the fixed portion 2-100, and the movable portion 2-200. The second damping element may directly contact the second connecting assembly 2-500, the holder 2-210, and the frame 2-220.

In this embodiment, the movable portion 2-200, the first connecting assembly 2-400, and the second connecting assembly 2-500 are formed integrally into a spring sheet, so the first connecting assembly 2-400 and the second connecting assembly 2-500 has an elastic material. Moreover, the length and thickness of the first connecting assembly 2-400 and the second connecting assembly 2-500 are different (the first connecting assembly 2-400 is longer and thinner, and the second connecting assembly 2-500 is shorter and thicker), so that the holder 2-210 has a first resonance frequency relative to the frame 2-220, and the movable portion 2-200 has a second resonance frequency relative to the fixed portion 2-100. The first resonance frequency is different from the second resonance frequency. Therefore, a control assembly (not shown) may input a control signal of the same frequency to resonate to drive the movable portion 2-200 and/or the holder 2-210. In some embodiments, the first resonance frequency is higher than the second resonance frequency. For example, the first resonance frequency is between about 300 Hz and 1000 Hz, the second resonance frequency is between about 10 Hz and 30 Hz, and the first resonance frequency may be more than 10 times the second resonance frequency.

But it is not limited to this, the movable portion 2-200, the first connecting assembly 2-400, and the second connecting assembly 2-500 may also be formed by different elements. For example, in some embodiments, the first connecting assembly 2-400 may use a bearing mechanism having balls, and the balls are arranged between the fixed portion 2-100 and the movable portion 2-200, so that the movable portion 2-200 may rotate relative to the fixed portion 2-100.

The driving assembly 2-300 includes a first magnetic unit 2-310, a second magnetic unit 2-320, and a coil 2-330. The first magnetic unit 2-310 is arranged near an outer periphery of the frame 2-220, and the second magnetic unit 2-320 is arranged opposite to the first magnetic unit 2-310. The coil 2-330 is disposed on the frame 2-220. More specifically, as shown in FIG. 10, the coil 2-330 may be formed on the top and bottom sides of the frame 2-220 through metallic printing ink or other circuit-on-metal technology. The coil 2-330 formed by the above technology may also be used as the circuit component 2-600 at the same time, which may electrically connect, for example, the optical element 2-10 to an external circuit. It may also be connected to a position sensing element (for example, a Hall sensing element) to sense the position of the movable portion 2-200 relative to the fixed portion 2-100. When viewed in a direction that is parallel to the main axis 2-M, the first magnetic unit 2-310 and the second magnetic unit 2-320 have an arc structure, respectively bending toward the main axis 2-M to correspond the shape of the frame 2-220, and the first magnetic unit 2-310, the second magnetic unit 2-320 and the coil 2-330 do not overlap.

It should be particularly noted that the magnetic pole directions of the first magnetic unit 2-310 and the second magnetic unit 2-320 are the same, and the first magnetic unit 2-310, the second magnetic unit 2-320 and the main axis 2-M form a first connection line 2-L. The first connection line 2-L is not parallel to the first direction 2-D1 and the second direction 2-D2. In some embodiments, it will be better that an angle formed by the first connection 2-L and the first connecting assembly 2-400 extending along the first direction 2-D1 is 45 degrees, because the electromagnetic driving force generated between the first magnetic unit 2-310, the second magnetic unit 2-320 and the coil 2-330 will be better. But it is not limited to this, and may be changed as required.

The coil 2-330 is configured to receive a first driving signal and a second driving signal output by the control assembly. The first driving signal and the second driving signal may be AC signals having different waveforms and frequencies. When the coil 2-330 receives the first driving signal, the driving assembly 2-300 drives the movable portion 2-200 to move in a first dimension relative to the fixed portion 2-100. When the coil 2-330 receives the second driving signal, the driving assembly 2-300 drives the holder 2-210 to move relative to the frame 2-220 in a second dimension. The first dimension is different from the second dimension. More specifically, the to move in the first dimension refers to rotate around a first rotating axis 2-C1, and to move in the second dimension refers to rotate around a second rotating axis 2-C2, and the first rotating axis 2-C1 is parallel to the first direction 2-D1, and the second rotating axis 2-C2 is parallel to the second direction 2-D2.

In this embodiment, the frequency of the second driving signal is the same as the first resonance frequency, so it is similar to the way in which the second optical element 2-R1 is driven to rotate in the embodiment shown in FIG. 5. The frame 2-210 rotates back and forth around the second rotating axis 2-C2 in a continuous motion in an angle range relative to the frame 2-220.

In some embodiments, the frequency of the first driving signal is the same as the second resonance frequency. The first driving signal includes a traveling signal and a return signal. When the coil 2-330 receives the traveling signal, the driving assembly 2-300 drives the movable portion 2-200 to perform a first rotation around the first rotating axis 2-C1 relative to the fixed portion 2-100. When the coil 2-330 receives the return signal, the driving assembly 2-300 drives the movable portion 2-200 to perform a second rotation around the first rotating axis 2-C1 relative to the fixed portion 2-100. An absolute value of an angular velocity of the first rotation is different from an absolute value of an angular velocity of the second rotation. More specifically, the absolute value of the angular velocity of the first rotation is smaller than the absolute value of the angular velocity of the second rotation. Therefore, the waveform formed by the traveling signal and the returning signal may be a sawtooth wave.

However, the movable portion 2-200 may be driven to rotate relative to the fixed portion 2-100 around the first rotating axis 2-C1 by a method which is different from the method using same resonant frequency described above. In some embodiments, the method of driving the first optical element 2-PR shown in the embodiment of FIG. 5 and FIG. 6 may be taken. That is, a current is applied to the coil 2-330 to generate the electromagnetic driving force between the first magnetic unit 2-310, the second magnetic unit 2-320 and the coils 2-330, and the movable portion 2-200 is driven to rotate around the first rotating axis 2-C1 in the intermittently stepped manner relative to the fixed portion 2-100.

The driving assembly 2-300 may be configured to simultaneously drive the movable portion 2-200 to move relative to the fixed portion 2-100 in the first dimension and drive the holder 2-210 to move relative to the frame 2-220 in the second dimension. More specifically, by simultaneously inputting the first driving signal and the second driving signal to the coil 2-330 by the control assembly, the driving assembly 2-300 may drive the movable portion 2-200 to move relative to the fixed portion 2-100 in the first dimension and simultaneously drive the holder 2-210 to move relative to the frame 2-220 in the second dimension.

The emitting element 2-TX makes the light 2-L1 incident on the optical element (the first optical element 2-PR and the second optical element 2-R1, or the optical element 2-10) of the embodiment described above, and by controlling the movement of two optical elements or one optical element on two axes allows the light reflected by the optical element to form a scanning range. In other words, controlling the rotation angle range of the optical element may further control the scanning range.

The emitting element 2-TX may emit light 2-L1 in the form of a pulse wave, and as mentioned above, the first driving signal and the second driving signal may have different waveforms. In some embodiments in which the second driving signal is a sine wave, due to the characteristics of the sine wave, when the holder rotates within the angle range, the speed of the rotation in the middle angle is faster than the speed of the rotation in a small or big angles of the angle range, so that the light reflected by the optical element is less in the middle part than the two side parts of the scanning range. Therefore, the resolution of the middle part of the scanning range is worse than that of the two side parts.

In order to solve the above-mentioned problem, when the driving assembly 2-300 drives the holder 2-210 to move in a cycle (i.e., to rotate the angle range once) in the second dimension relative to the frame 2-220, the emitting element 2-TX may emit lights 2-L1 with at least two or more frequencies. In some embodiments, the lights 2-L1 emitted by the emitting element 2-TX may be set to two frequencies to correspond to the middle part and the two side parts of the scanning range respectively. More specifically, the higher frequency light 2-L1 is emitted to correspond to the faster scanning speed in the middle part, so that the amount of lights 2-L1 reflected to the middle part of the scanning range is close to the amount of lights 2-L1 reflected to the two side parts, thereby improving the resolution.

Figure 12:
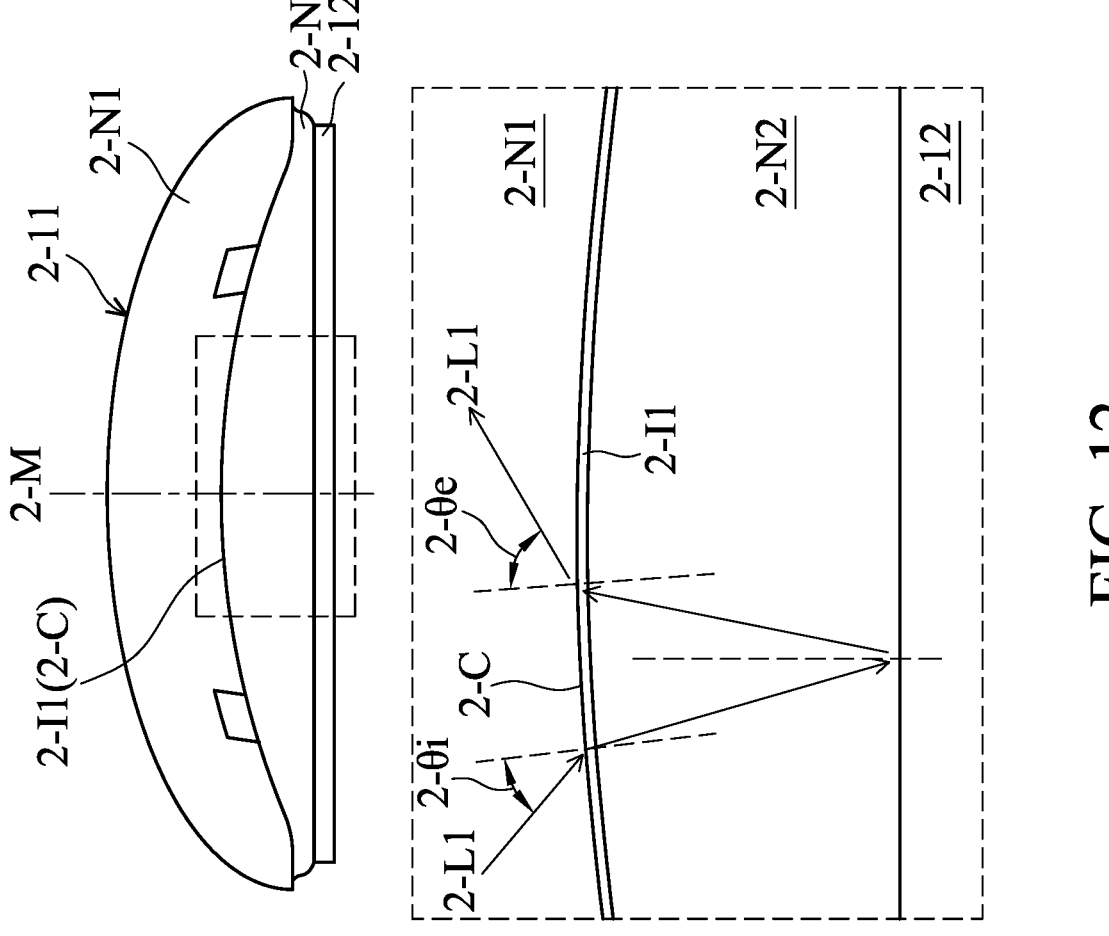
FIG. 12 is a side view of an optical element of another embodiment of the disclosure.
Figure 13:
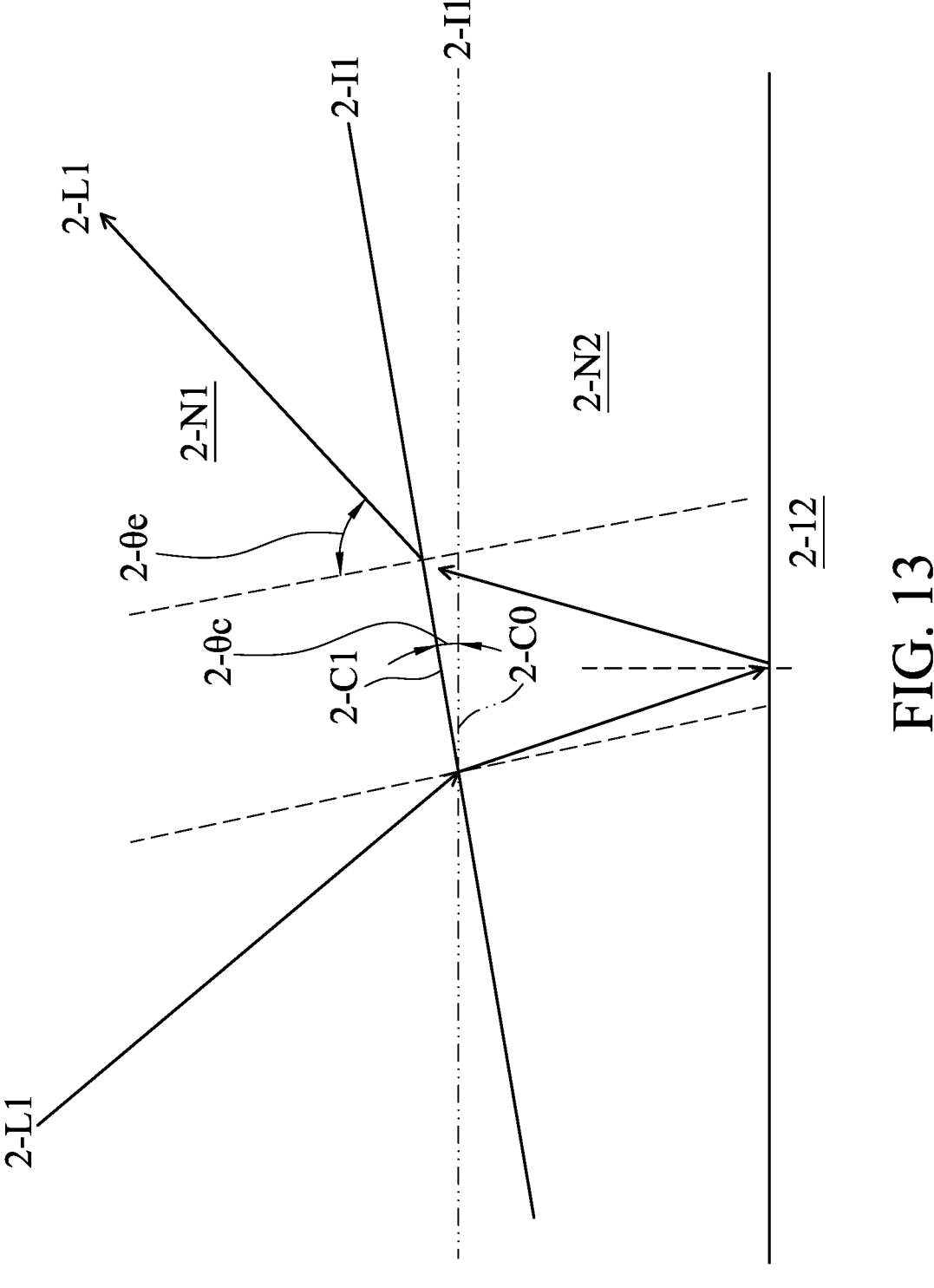
FIG. 13 is a schematic diagram showing that an emitting angle of the light varies with an interface angle of another embodiment of the disclosure.
Figure 14:
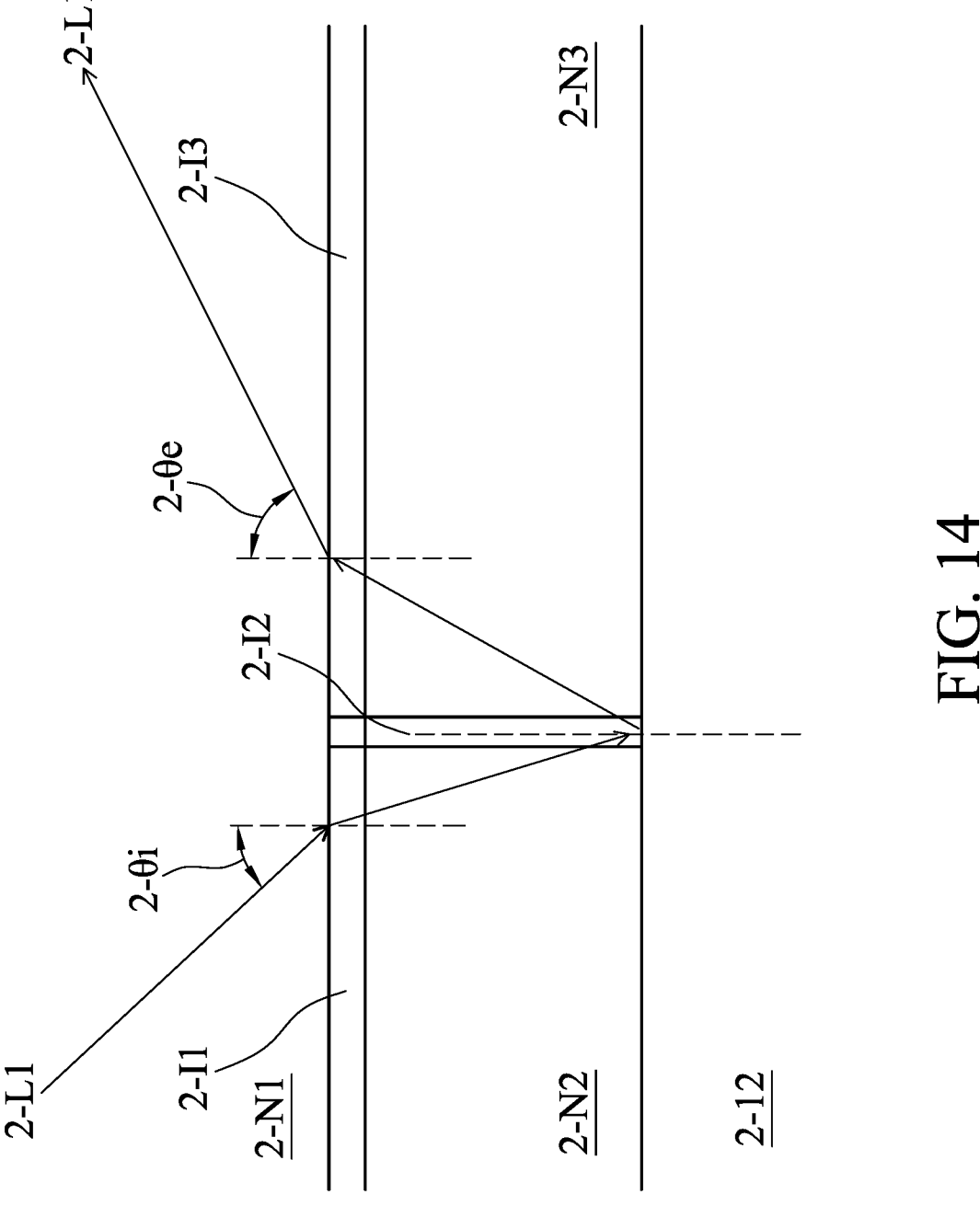
FIG. 14 is a schematic diagram of light traveling through an optical element of another embodiment of the disclosure.

In addition to controlling the rotation angle range of the optical element 2-10, the scanning range may also be controlled by the optical element 2-10. Next, Refer to FIGS. 12 to 14 to explain how the optical element 2-10 controls the scanning range. FIG. 12 is a side view of the optical element 2-10 according to another embodiment of the disclosure. FIG. 13 is a schematic diagram showing that an emitting angle 2-θe of the light 2-L1 changes with an interface angle 2-θc according to another embodiment of the disclosure. FIG. 14 is a schematic diagram of the light 2-L1 traveling through an optical element 2-10 according to another embodiment of the disclosure. It should be noted that although the following description takes the optical element 2-10 in FIG. 9 as an example, however, it is not limited to use in the optical element driving mechanism of FIG. 5, and may be changed as required, for example, to replace the second optical element 2-R1 in FIG. 2. The optical element 2-10 may include a first lens 2-11 and a reflective element 2-12, and the reflective element 2-12 is disposed between the first lens 2-11 and the holder 2-210. The first lens 2-11 includes a first medium 2-N1 and a second medium 2-N2. The second medium 2-N2 is closer to the reflective element 2-12 than the first medium 2-N1. When viewed in the direction that is parallel to the main axis 2-M, the first medium 2-N1 and the second medium 2-N2 at least partially overlap. A refractive index of the first medium 2-N1 is different from a refractive index of the second medium 2-N2. More specifically, the refractive index of the first medium 2-N1 is smaller than the refractive index of the second medium 2-N2.

In some embodiments, the first lens 2-11 may be a liquid lens, the first medium 2-N1 may be an encapsulating liquid (for example, an alcohol solution), and the second medium 2-N2 may be a lens liquid (for example, silicone oil). Since the first medium 2-N1 and the second medium 2-N2 are not mutually soluble, there is a first interface 2-11 between the first medium 2-N1 and the second medium 2-N2. The first interface 2-11 has a curvature 2-C. With this curvature 2-C, as shown in the enlarged schematic diagram framed by the dashed line in FIG. 12, the emitting angle 2-θe of the light 2-L1 is greater than the incident angle 2-θi. Therefore, compared with a flat reflective element as an optical element, the optical element 2-10 of this embodiment of the disclosure may magnify the emitting angle 2-θe. Therefore, if the rotation angle range of the optical element is controlled to the same, using the optical element 2-10 of this embodiment of the disclosure may achieve a larger scanning range.

In addition, the first interface 2-11 may be driven to deform by connecting the circuit component 2-600 to the first lens 2-11. More specifically, the first interface 2-11 generates a dielectric force by applying a voltage, and an acting direction of the dielectric force will be squeezed from the alcohol solution with a high dielectric constant to the silicone oil with a low dielectric constant, thereby changing the curvature 2-C of the first interface 2-11. As shown in FIG. 13, the first interface 2-11 which a voltage has been applied on (solid line) is different from the first interface 2-11 which the voltage has not been applied on (two-point chain line) by an interface angle 2-θc, and the curvature 2-C is also increased from the curvature 2-C0 to the curvature 2-C1, so that the emitting angle 2-Oe of the light 2-L1 is greater than the emitting angle 2-θe before the change. Therefore, the curvature 2-C may be increased by applying a high voltage to achieve a larger scanning range, and relatively, the curvature 2-C may also be reduced by applying a low voltage to complete a smaller scanning range.

In addition to applying a voltage to the optical element 2-10 via the circuit component 2-600, which chemically changes the curvature 2-C of the first interface 2-11, there are some methods may be used to change the curvature 2-C. The first medium 2-N1 and the second medium 2-N2 are not limited to liquid composition, and may also include solid, gas, etc. compositions. Therefore, a piezoelectric mechanism (not shown) may also be provided to connect the optical element 2-10, and the curvature 2-C of the first interface 2-I1 may be changed in a physical manner by the piezoelectric mechanism. More specifically, a piezoelectric sheet may be arranged under a lens 2-11, and the first lens 2-11 is squeezed by the piezoelectric sheet deformed after being applied a voltage, thereby changing the curvature 2-C of the first interface 2-11. In other words, the curvature 2-C may be controlled by at least one of a chemical method or a physical method, thereby controlling the emitting angle 2-θe of the light 2-L1 emitted through the optical element 2-10.

In addition, the first lens 2-11 may include a larger number of media, or the optical element 2-10 may include more lenses, both of which may be changed according to requirements. For example, in other embodiments, as shown in FIG. 14, the first lens 2-11 may further include a third medium 2-N3, and the third medium 2-N3 is closer to the reflective element 2-12 than the first medium 2-N1. There is a second interface 2-12 between the second medium 2-N2 and the third medium 2-N3, and the first interface 2-11 and the second interface 2-12 are not parallel. There is a third interface between the first medium and the second medium. The first interface and the third interface are not parallel. When viewed in a direction that is parallel to the main axis 2-M, the first medium 2-N1 and the third medium 2-N3 at least partially overlap. When viewed in a direction perpendicular to the main axis 2-M, the second medium 2-N2 and the third medium 2-N3 at least partially overlap. The emitting angle 2-θe may be changed by the configuration of different refractive indexes between the media to control the scanning range. For example, the refractive index of the first medium 2-N1 is smaller than the refractive index of the second medium 2-N2, and the refractive index of the second medium 2-N2 is smaller than the refractive index of the third medium 2-N3, so that the emitting angle 2-θe is enlarged, thereby expanding the scanning range.

In summary, the driving assembly 2-300 controls the movable portion 2-200 to move relative to the fixed portion 2-100 in the first dimension, thereby controlling the scanning formed by the light 2-L1 reflected by the optical element 2-10 The driving assembly 2-300 controls the movement of the holder 2-210 relative to the frame 2-220 in the second dimension, and also controls the scanning range formed by the light 2-L1 reflected by the optical element 2-10. In some embodiments, the reflected light 2-L1 may form a scanning range in a rectangular shape. When the movement in the second dimension is performed for one period, a plurality of reflected light rays 2-L1 form a plurality of light spots on the object 2-O, and because density of the light spots is high, the light spots may be regarded as forming a scanning ray on a direction along a long side of the rectangular scanning range. When the movement in the first dimension is performed by an angle, a distance between the scanning rays is formed on a direction along a short side of the rectangular scanning range. Generally, the smaller the distance, the higher the scan resolution. Therefore, controlling the movement of the second dimension may control the size of the long side of the scanning range, and controlling the movement of the first dimension may control the size of the short side of the scanning range. The size of the long side and/or short side of the scanning range may also be controlled by the different designs of the optical elements 2-10.

In addition, a shape of the cross-sectional area of the light 2-L1 may also be changed by the optical element 2-10, thereby changing a scanning time. For example, the cross-sectional area of the light 2-L1 reflected by the optical element 2-10 has an elliptical shape, and a long axis of the elliptical shape is perpendicular to the long side of the scanning range. In this way, the distance of the scanning lines may be set to be larger and maintain a similar resolution, but the scanning time may be greatly reduced.

In some embodiments, a plurality of optical element driving mechanisms 2-1 may be arranged along a third direction to form an optical system, wherein each optical element driving mechanism 2-1 outputs different information, and then the information output by each optical element driving mechanism 2-1 is integrated into the final information through an programming unit. In other words, if the range of the object 2-O to be scanned is large, each optical element driving mechanism 2-1 may be made to be separately scan a partial range of the object 2-O, and the information of the entire range of the object 2-O may finally obtained by the programming unit. Compared with an optical element driving mechanism 2-1 scanning the entire object 2-O, the above-mentioned optical system may get better resolution.

As described above, the embodiment of the present disclosure provides an optical element driving mechanism having a main axis, including a movable portion, a fixed portion, a driving assembly, and a first connecting assembly. The movable portion is connected with an optical element and is movable relative to the fixed portion, and the driving assembly drives the movable portion to move relative to the fixed portion. The movable portion is movably connected to the fixed portion via the first connecting assembly. The driving assembly controls the movement of the movable portion relative to the fixed portion in different dimensions, thereby controlling the scanning range formed by the light reflected by the optical element. Therefore, controlling the scanning range by the driving assembly and the optical element, a low-cost and high-performance optical sensing system may be obtained. The special position and size relationship of each element disclosed in the present invention may enable the optical element driving mechanism to achieve a specific direction of thinning and overall miniaturization. In addition, by applying with different optical modules, the optical element driving mechanism may further improve the optical quality (such as depth sensing accuracy, etc.).

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical element driving mechanism, comprising:
a fixed portion;
a movable portion, connected to an optical element, moving relative to the fixed portion;
a driving assembly, driving the movable portion to move relative to the fixed portion; and
a first connecting assembly, wherein the movable portion is movably connected to the fixed portion via the first connecting assembly;
wherein the movable portion comprises:
a frame;
a holder, connected to the optical element, moving relative to the frame; and a second connecting assembly, wherein the holder is movably connected to the frame via the second connecting assembly;

wherein the first connecting assembly has a strip structure extending along a first direction;

wherein the second connecting assembly has a strip structure extending along a second direction;

wherein the first connecting assembly has a structure that is wide at both ends and narrow in the middle in the first direction;

wherein the second connecting assembly has a structure that is wide at both ends and narrow in the middle in the second direction;

wherein the frame comprises a side portion and a protruding portion;

wherein the side portion is connected to the protruding portion;

wherein the protruding portion is connected to the second connecting assembly;

wherein the side portion overlaps the second connecting assembly and the side portion does not overlap the protruding portion when viewed along the first direction;

wherein the side portion has a first surface that faces away from the holder, and the first surface is parallel to the first direction;

wherein the protruding portion has a second surface that faces the holder and is directly connected to the second connecting assembly, and the second connecting assembly extends from the second surface along the second direction;

wherein the protruding portion protrudes from the first surface away from the holder; and wherein the side portion extends in the first direction.

2. The optical element driving mechanism as claimed in claim 1, wherein the movable portion has a first resonant frequency relative to the fixed portion, and the holder has a second resonant frequency relative to the frame, wherein the first resonant frequency and the second resonant frequency are different.

3. The optical element driving mechanism as claimed in claim 2, wherein the first direction is not parallel to the second direction, and the largest dimension of the first connecting assembly in the first direction is different from the largest dimension of the second connecting assembly in the second direction.

4. The optical element driving mechanism as claimed in claim 3, wherein the first direction is perpendicular to the second direction, and the largest dimension of the first connecting assembly in the first direction is greater than the largest dimension of the second connecting assembly in the second direction.

5. The optical element driving mechanism as claimed in claim 3, further comprising a control assembly, wherein the control assembly outputs a first driving signal and a second driving signal, wherein the driving assembly comprises:

a first driving element, comprising:

a first magnetic unit with a polygonal strip structure, extending along the first direction; and a first coil receiving the first driving signal and the second driving signal;

wherein the first coil receives the first driving signal, so that the driving assembly drives the movable portion to move relative to the fixed portion in a first dimension, and wherein the first coil receives the second driving signal, so that the driving assembly drives the holder to move relative to the frame in a second dimension;

wherein the first dimension is different from the second dimension.

6. The optical element driving mechanism as claimed in claim 5, wherein a movement in the first dimension is a rotation about a first rotation axis, and a movement in the second dimension is a rotation about a second rotation axis.

7. The optical element driving mechanism as claimed in claim 6, wherein the first rotation axis is parallel to the first direction, and the second rotation axis is parallel to the second direction.

8. The optical element driving mechanism as claimed in claim 6, wherein the first driving signal comprises:

a first signal, received by the first coil, driving the movable portion to perform a first rotation about the first rotation axis relative to the fixed portion; and a second signal, received by the first coil, driving the movable portion to perform a second rotation about the first rotation axis relative to the fixed portion;

wherein the absolute value of the angular velocity of the first rotation is different from the absolute value of the angular velocity of the second rotation.

9. The optical element driving mechanism as claimed in claim 8, wherein the absolute value of the angular velocity of the first rotation is less than the absolute value of the angular velocity of the second rotation.

10. The optical element driving mechanism as claimed in claim 5, wherein the frequency of the second driving signal is equal to the second resonant frequency.

11. The optical element driving mechanism as claimed in claim 5, further comprising a main axis perpendicular to a first axis through the first connecting element in the first direction and a second axis through the second connecting element in the second direction, wherein when viewed along the main axis, a first connecting line is formed between the first magnetic unit or the first coil and the main axis, wherein the first connecting line is not parallel to the first direction or the second direction.

12. The optical element driving mechanism as claimed in claim 5, wherein the first coil receives the first driving signal and the second driving signal at the same time, so that the driving assembly drives the movable portion to move in the first dimension relative to the fixed portion and the holder to move in the second dimension relative to the frame at the same time.

13. The optical element driving mechanism as claimed in claim 5, wherein the driving assembly further comprises:

a second driving element, comprising:

a second magnetic unit with a polygonal strip structure, extending along the first direction; and a second coil receiving the first driving signal and the second driving signal.

14. The optical element driving mechanism as claimed in claim 1, further comprising an emission element emitting a light ray to the optical element connected to the holder;

wherein the light ray is affected by the movement of the optical element and changes a travelling direction when the holder is driven by the driving assembly to move relative to the frame.

15. The optical element driving mechanism as claimed in claim 14, wherein the optical element comprises a reflecting mirror.

16. The optical element driving mechanism as claimed in claim 1, further comprising a first damping element limiting the movement of the movable portion relative to the fixed portion, wherein the first damping element is in direct contact with the first connecting assembly.

17. The optical element driving mechanism as claimed in claim 16, further comprising a second damping element limiting the movement of the holder relative to the frame, wherein the second damping element is in direct contact with the second connecting assembly.

18. An optical system, comprising:

a plurality of optical element driving mechanisms as claimed in one of the preceding claims, wherein the optical element driving mechanisms are arranged along a third direction, wherein each of the optical element driving mechanisms outputs a piece of information; and a calculating unit, integrating multiple pieces of information output by the optical element driving mechanisms into an integrated information, wherein the scope of the integrated information is greater than the scope of any one of the information.

* * * * *